(12) United States Patent
Allegra et al.

(10) Patent No.: US 9,432,631 B2
(45) Date of Patent: Aug. 30, 2016

(54) SURVEILLANCE SYSTEM

(75) Inventors: Manlio Allegra, Los Altos Hills, CA (US); Martin Feuerstein, Redmond, WA (US); Mahesh B. Patel, Saratoga, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 460 days.

(21) Appl. No.: 13/438,188

(22) Filed: Apr. 3, 2012

(65) Prior Publication Data

US 2012/0249787 A1 Oct. 4, 2012

Related U.S. Application Data

(60) Provisional application No. 61/471,362, filed on Apr. 4, 2011.

(51) Int. Cl.

| | |
|---|---|
| *H04N 9/47* | (2006.01) |
| *H04N 7/18* | (2006.01) |
| *H04W 4/02* | (2009.01) |
| *H04W 4/22* | (2009.01) |
| *G06K 9/00* | (2006.01) |

(52) U.S. Cl.
CPC ............. *H04N 7/18* (2013.01); *H04W 4/02* (2013.01); *H04W 4/22* (2013.01); *G06K 2009/00328* (2013.01)

(58) Field of Classification Search
USPC ........................................................ 348/143
See application file for complete search history.

(56) References Cited

U.S. PATENT DOCUMENTS

| | | | |
|---|---|---|---|
| 2006/0007318 A1* | 1/2006 | Kanayama et al. | 348/211.3 |
| 2008/0167959 A1* | 7/2008 | Lovell | 705/14 |
| 2010/0007712 A1* | 1/2010 | Jang | 348/14.02 |
| 2011/0083101 A1* | 4/2011 | Sharon et al. | 715/800 |
| 2012/0127263 A1* | 5/2012 | Ogle et al. | 348/14.09 |

* cited by examiner

*Primary Examiner* — Tracy Li
(74) *Attorney, Agent, or Firm* — Kaplan Breyer Schwarz & Ottesen LLP

(57) ABSTRACT

Data from a wireless network location system is used in conjunction with the known geographic location of a video surveillance area such that the system according to the present invention infers that a person who appears in an image in the video is the user of a mobile phone estimated to be at the person's location. When facial recognition is applied and the person's identity is thus recognized, an association is generated as between the identity according to the facial recognition and the identity of the co-located mobile phone. This association can be critical when there is no personal identification available for a mobile phone such as a pre-paid mobile.

15 Claims, 19 Drawing Sheets

Video Augmentation System 100

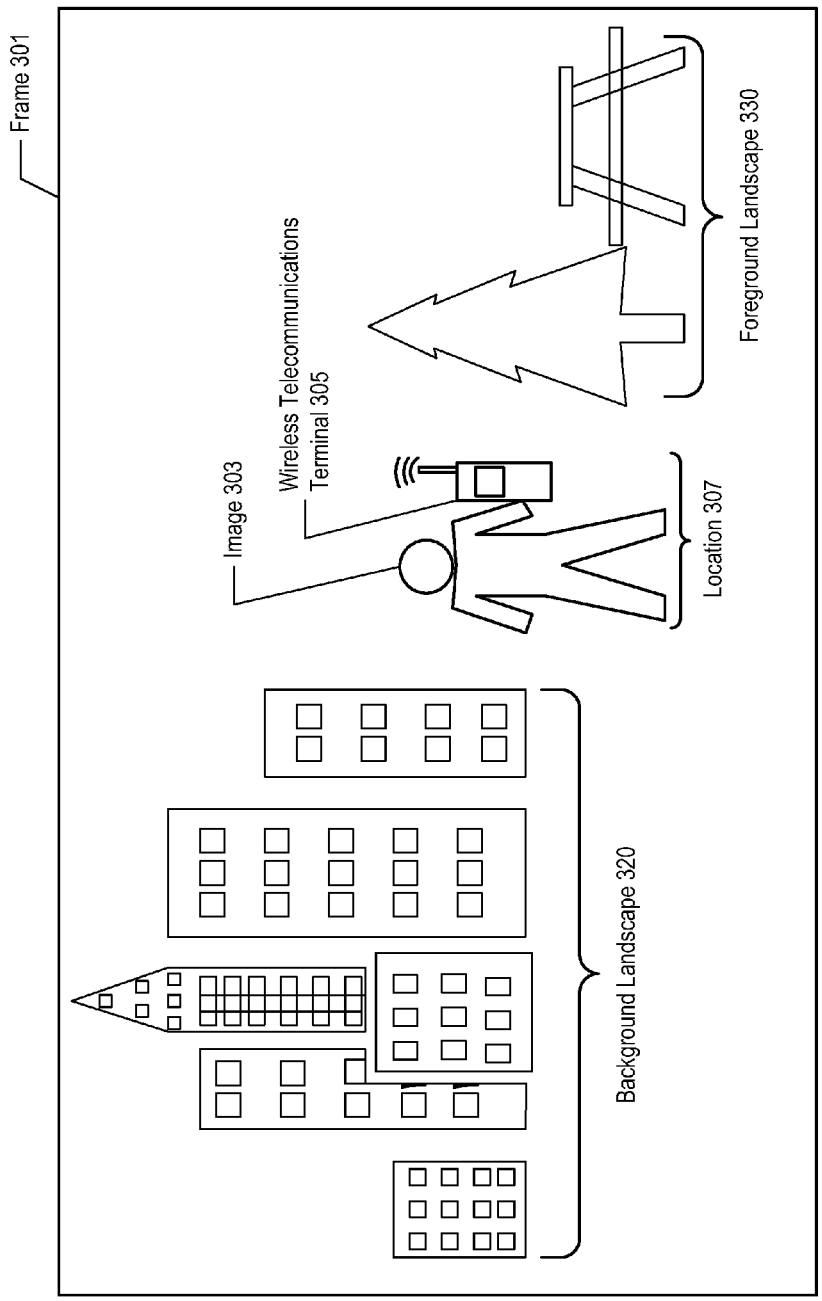

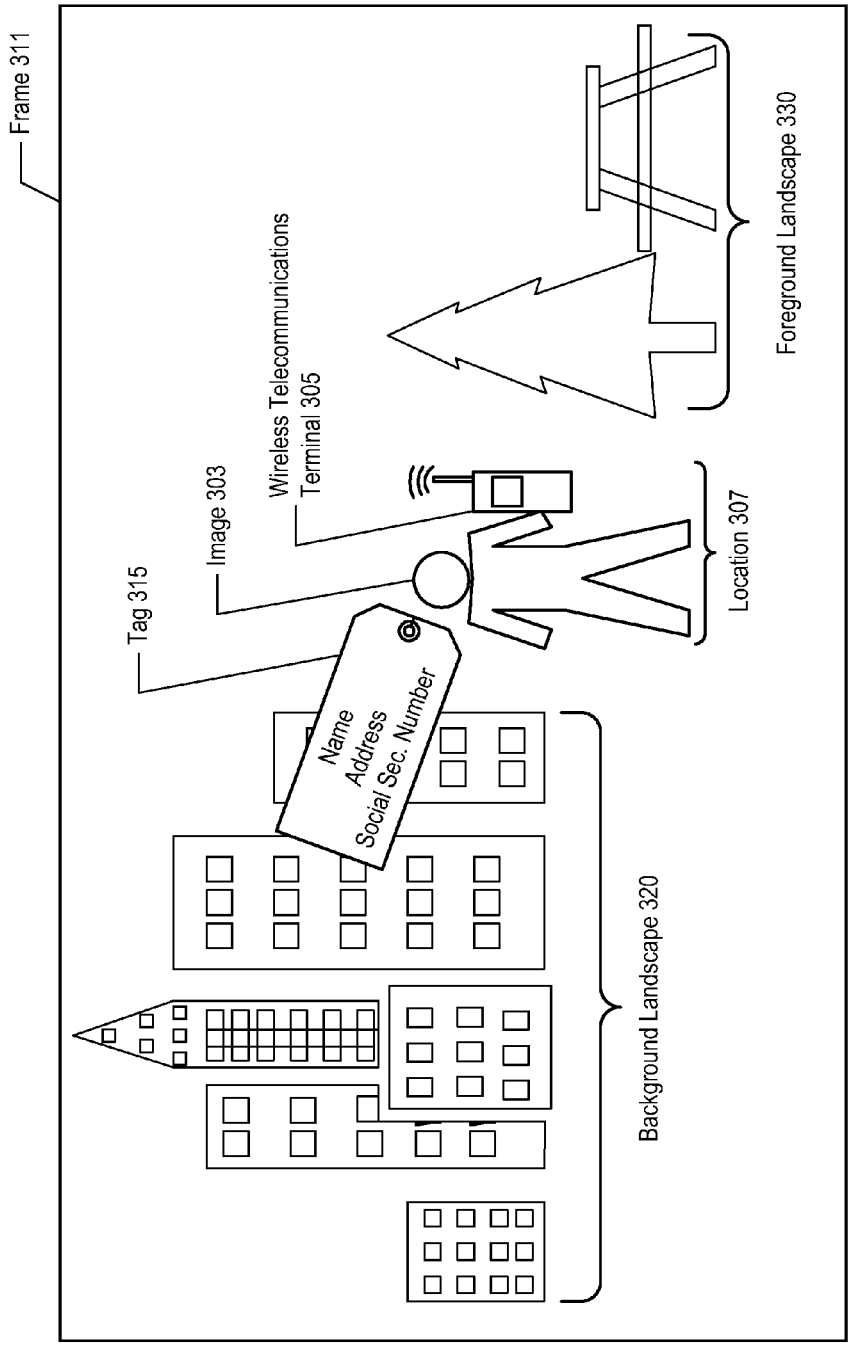

Illustrative Frame Of Composite Video Signal 400

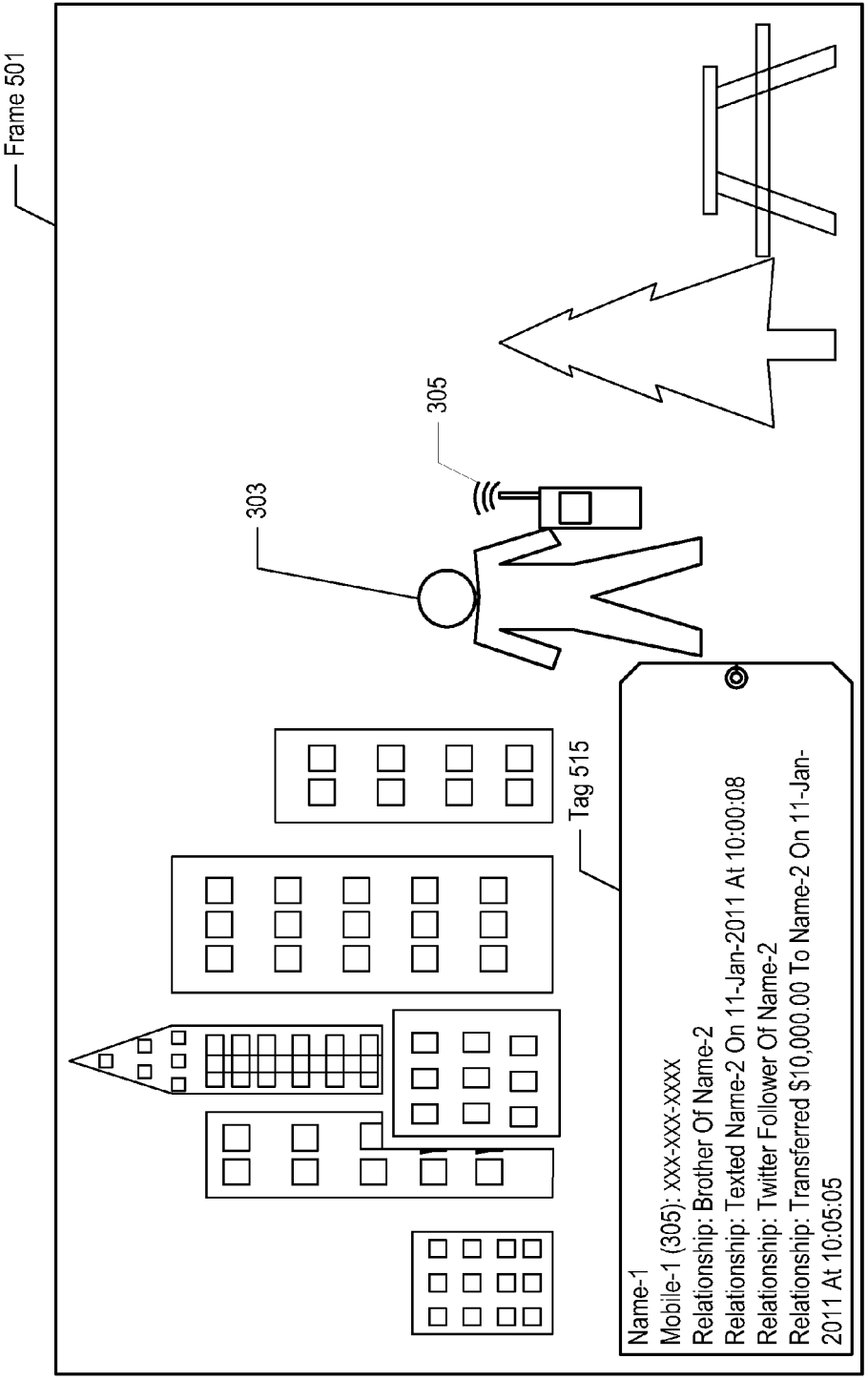

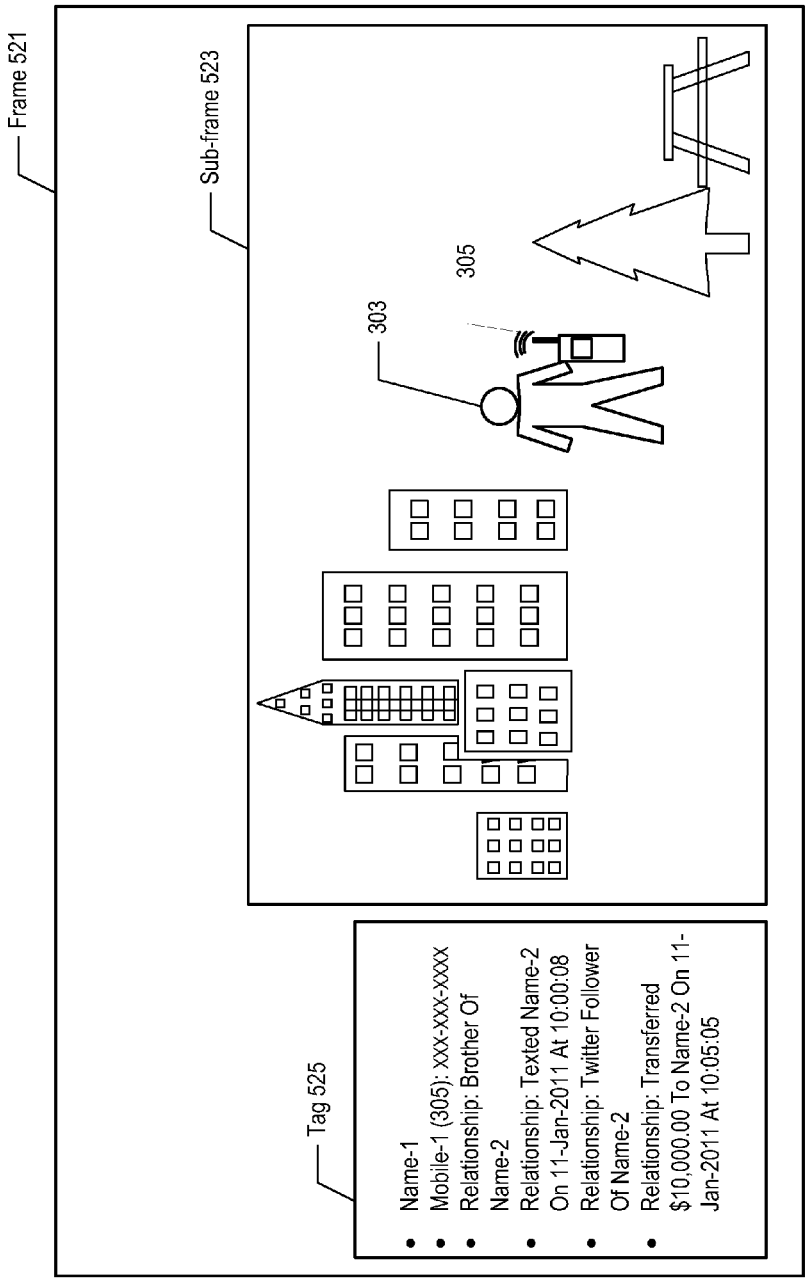

First Illustrative Frame Of Composite Video Signal 600

Second Illustrative Frame Of Composite Video Signal 600

Third Illustrative Frame Of Composite Video Signal 600

700

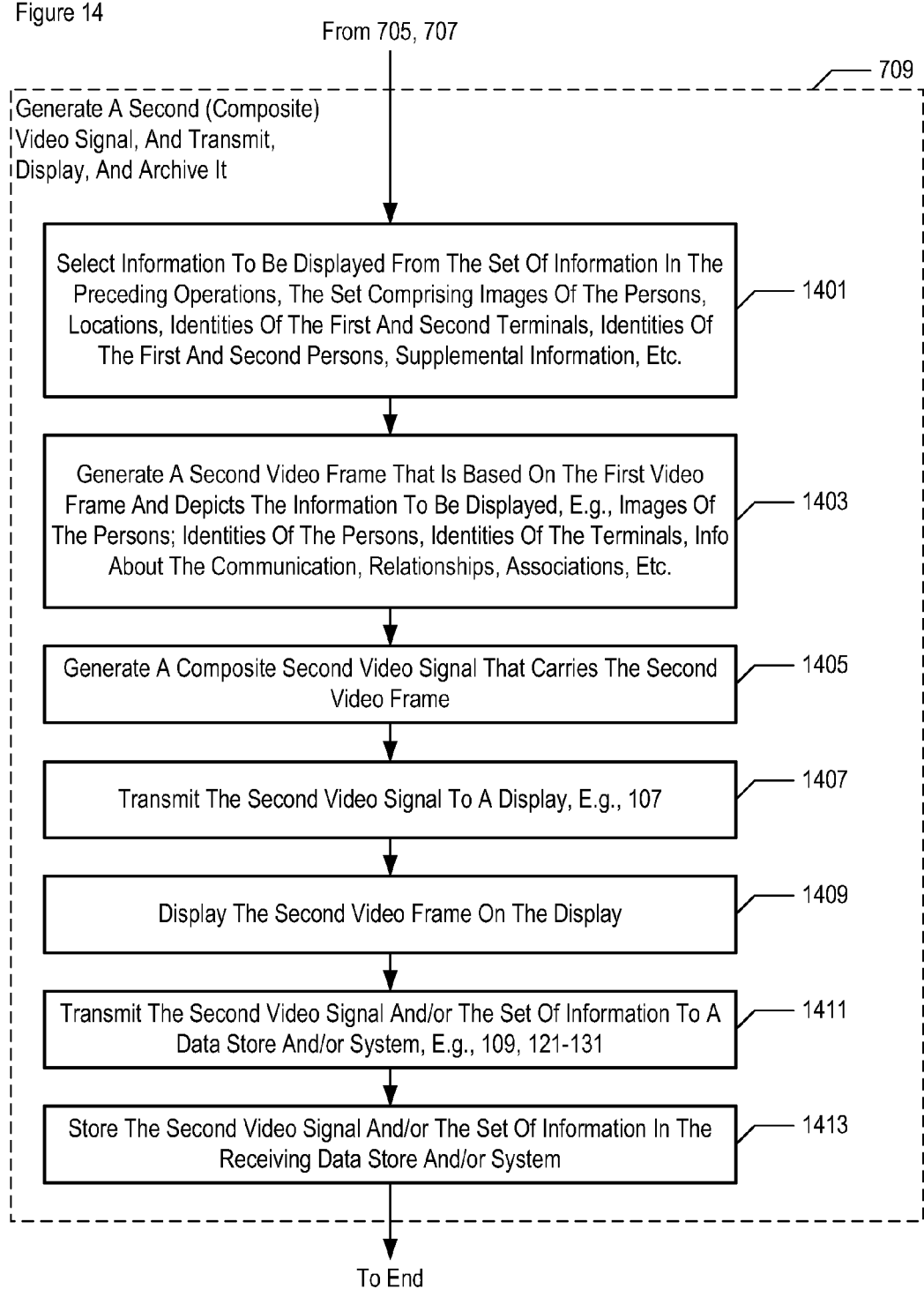

SURVEILLANCE SYSTEM

CROSS-REFERENCE TO RELATED APPLICATIONS

This application claims the benefit of U.S. Provisional Patent Application No. 61/471,362, filed on 4 Apr. 2011, entitled "Unified Synchronous CCTV Camera Information Display and Storage System", which is incorporated by reference herein.

FIELD OF THE INVENTION

The present invention relates to surveillance systems in general, and, more particularly, to augmenting the video stream of a surveillance system.

BACKGROUND OF THE INVENTION

Surveillance systems are being deployed in increasing numbers, in both public and private venues, for security and counter-terrorism purposes. Typically, a surveillance system employs one or more closed-circuit television (CCTV) cameras and delivers the video feed (i.e., video signal) from a CCTV camera to one or both of:
  a display for real-time monitoring by a human operator, and
  archival storage that enables future viewing of the video.
Often, however, the operators of the surveillance system are unable to identify the people in the video. Therefore, the need exists for an improved technique for identifying the people in surveillance video.

SUMMARY OF THE INVENTION

The operator of a surveillance system often desires four pieces of information for each person of interest:
  the person's identity,
  the person's location at a given time,
  a clear picture of the person's face, and
  the person's mobile telephone number (so that the operator can eavesdrop on the person's voice and text communications).
Often, however, the operator does not have all four pieces. The pieces that a surveillance system can ascertain depend on the circumstances.

First, the video feed of a surveillance system is invariably able to ascertain a person's location at a given time—from the mere fact that there is a person in the picture. The video surveillance system might or might not be able to identify the person, but it can show that a person—some person—is present at a specific location at a specific time. And by using projective geometry and trigonometry, the location of the person can be ascertained precisely.

Second, the surveillance system might or might not capture a clear picture of the person's face. If the person is intentionally hiding his or her face or if the lighting conditions are bad, then it might be difficult to capture a clear picture of the person's face.

Third, the surveillance system might be able to ascertain the person's identity by using a facial recognition system if the video feed does in fact capture a clear picture of the person's face. If the person's face and identity are not in the facial recognition system, then it might be difficult to ascertain the person's identity.

Fourth, the surveillance system might be able to ascertain the person's mobile phone telephone number if it can ascertain his or her identity. But if the person carries a disposable mobile phone or uses an alias to register his or her mobile phone, then it might be difficult to ascertain the person's mobile phone telephone number.

In contrast, embodiments of the present invention augment the information available to a traditional surveillance system with the information available to a mobile phone location system. A mobile phone location system is typically used by a 911 call center to ascertain the location of a mobile phone so that police, fire, and first aid can respond to an emergency. Although a mobile phone location system is traditionally used to ascertain the unknown location of a mobile phone from a known telephone number, it can be used to correlate a mobile phone's location with its telephone number.

By using the information from a surveillance system in conjunction with a mobile phone location system, a number of inferences can be made that are unknowable to either system alone. For example and without limitation, a person at a given location (as determined from the video feed) and a mobile phone at the same location (as determined from the mobile phone location system) can be associated. If the phone is registered to a name, the person's identity can be tentatively established. Even if the phone is not registered to a name or is registered to an obvious alias, the operator can thereafter eavesdrop on the person's communications.

Some embodiments of the present invention are capable of:
  i. augmenting a video signal with information that is associated with persons who appear in the video—and also other information associated with persons who have a relevant relationship with persons who appear in the video;
  ii. augmenting a video with graphics depicting communications, financial transactions, social network connections, and personal information;
  iii. ascertaining the identity of a person in a video stream (e.g., via a facial-recognition system, via information from a wireless location system, via information from a lawful interception system, etc.);
  iv. ascertaining when an identified person initiates, terminates, or is currently participating in a communication (e.g., places a telephone call, receives a telephone call, hangs up, sends/receives a Short Message Service ("SMS") message, receives/sends an email, participates in an instant message ("IM") session, fetches a webpage within a browser, sends/receives a text message, receives/sends/participates in a social network system, e.g., Twitter, Facebook, LinkedIn, etc.);
  v. obtaining information associated with the communication (e.g., the mobile telephone number of the identified person or of the other parties involved in the communication, the type of communication, the identities of other parties involved in the communication, other information about one or more of the other parties, etc.);
  vi. generating graphics that represent the communication and depict some or all of the associated information;
  vii. ascertaining when an identified person initiates, terminates, or is currently executing a financial transaction (e.g., a bank deposit, a transfer from one account to another, an online purchase, etc.);
  viii. obtaining information associated with the financial transaction (e.g., the type of transaction, the magnitude/amount of the transaction, the identity of the financial institution, the identity of another party associated with the transaction, a bank account number, a credit card number, etc.);

ix. generating graphics that represent the financial transaction and depict the associated information;

x. obtaining other types of personal information associated with the identified person (e.g., the person's social security number, the person's driver's license number, an image of the person's driver's license, an image of the person's passport, the person's birthdate and/or birthplace, an image of the person's birth certificate, border crossing information, motor vehicle records, criminal history records, credit reports, home address, telephone directory information, etc.)—even when the identified person does not appear in the video but has a relevant relationship or association with a person who appears;

xi. generating graphics that depict the personal information;

xii. combining one or more of the generated graphics with the received video signal into a resultant "composite video," e.g., overlaying the graphics on the video stream, generating a new stream that comprises a first window with the video feed and a second window with the graphics, etc.;

xiii. estimating the identity of a confederate who is in communication with the mobile in the surveillance area—whether the confederate also appears in the video or not;

xiv. identifying relationships between the person in the video and others, including social relationships, familial relationships, financial relationships, communications past or present, etc.;

xv. identifying a relationship between two persons appearing in the surveillance video, even when the two persons are not actively communicating;

xvi. inferring that two persons appearing in the video are actively communicating, whether by voice call, text, or otherwise; and xvii. retrieving information about the identified person(s) and mobile(s) from other data sources, such as criminal records databases, public records databases, surveillance records, etc.

When facial recognition is applied to an image of a person appearing in a video and the person's identity is thus recognized, the illustrative video augmentation system generates an association between the identity according to the facial recognition and the identity of the "co-located" mobile phone. This association can be critical when there is no personal identification available for a mobile phone such as a pre-paid mobile. This association is displayed and also stored for archival purposes.

The composite video provides a unified view of activities and information associated with persons in the video feed, thereby enabling a human operator to view a great deal of information and manipulate it interactively in real time. Advantageously, the illustrative embodiment obtains and integrates the supplemental information automatically, without requiring the human operator to actively seek out and import these data. In addition, the illustrative embodiment archives the composite video for future viewing and analysis (e.g., for forensic analysis of a crime, etc.). As noted, the augmented information that is displayed in the composite video (and any other information, whether displayed in the composite video or not) is archived for future retrieval and analysis.

In accordance with the illustrative embodiment, communication, financial, social network, and personal information associated with a particular person appearing in the video stream is obtained by the system via one or more of the following techniques:

transmitting a query to or polling a remote entity (e.g., a public records database, a call record database, a criminal records database, a credit reporting database, a news source/database, a surveillance database, etc.), actively polling for pertinent events associated with the person (e.g., the initiation of a new communication, the termination of a communication, a new online transaction, etc.), and registering to be notified about events associated with the person (e.g., via a publish/subscribe messaging system, via an email generated by a database trigger, etc.).

An illustrative embodiment comprises: receiving, by a data-processing system, a first video signal that carries a first video frame, wherein the first video frame comprises an image of a person at a location; estimating the identity of a mobile phone based on the location of the person; estimating the identity of the person based on the identity of the mobile phone; and transmitting, by the data-processing system, a second video signal that carries a second video frame that is based on the first video frame, wherein the second video frame comprises: (i) the image of the person, and (ii) a depiction of the identity of the person.

BRIEF DESCRIPTION OF THE DRAWINGS

FIG. 3A depicts an illustrative frame of video signal 111 according to an illustrative embodiment of the present invention.

FIG. 3B depicts an illustrative frame of composite video signal 113 in accordance with an illustrative embodiment of the present invention.

FIG. 5A depicts an illustrative frame of composite video signal 500 according to an illustrative embodiment of the present invention.

FIG. 5B depicts an illustrative frame of composite video signal 520 according to an illustrative embodiment of the present invention.

FIG. 14 depicts a flowchart of the salient operations of illustrative operation 709 in accordance with an illustrative embodiment of the present invention.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume.

The term "composite video" is an electronic or electromagnetic signal that results from combining: (a) all or parts of the original video signal obtained from a surveillance camera or from another source of video material with (b) supplemental information that is to be displayed. Hereinafter and in the accompanying figures the terms "composite video" and "composite video signal" and "composite video stream" are used interchangeably.

The term "tag" is defined as a graphic that comprises information about something in the video signal, such as text, a text box, a balloon graphic, an arrow, an icon, a ticker tape strip, etc. A tag comprises information such as a name, a telephone number, an indicium of an active telephone conversation, an indicium of a data session, an indication of a relationship, a numerical designation of a person in the video, etc. The shape of the tag, the contents of the tag, and any other formatting aspects of the tag do not limit the present invention.

Figure 1A:
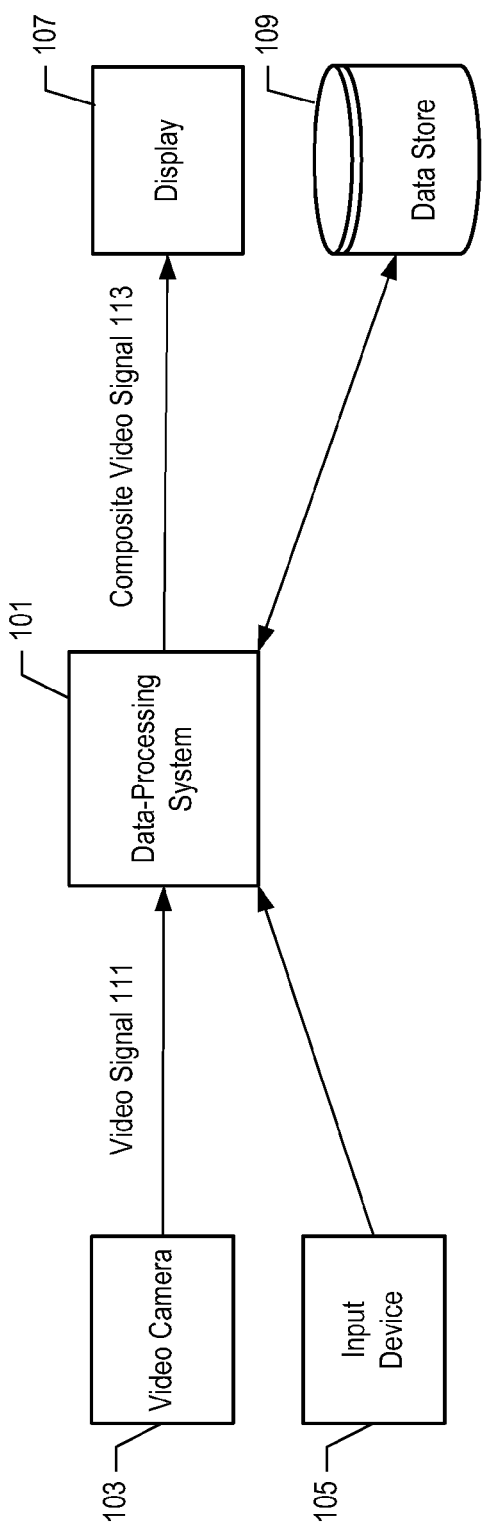
FIG. 1A depicts a block diagram of some salient components of video augmentation system 100 according to an illustrative embodiment of the present invention.

FIG. 1A depicts a block diagram of some salient components of video augmentation system 100 according to an illustrative embodiment of the present invention. Video augmentation system 100 comprises: data-processing system 101; video camera 103; input device 105; display 107; and data store 109. Furthermore, video signal 111 is transmitted from video camera 103 to data processing system 101, and composite video signal 113 is transmitted from data-processing system 101 to display 107 and/or to data store 109.

Figure 1B:
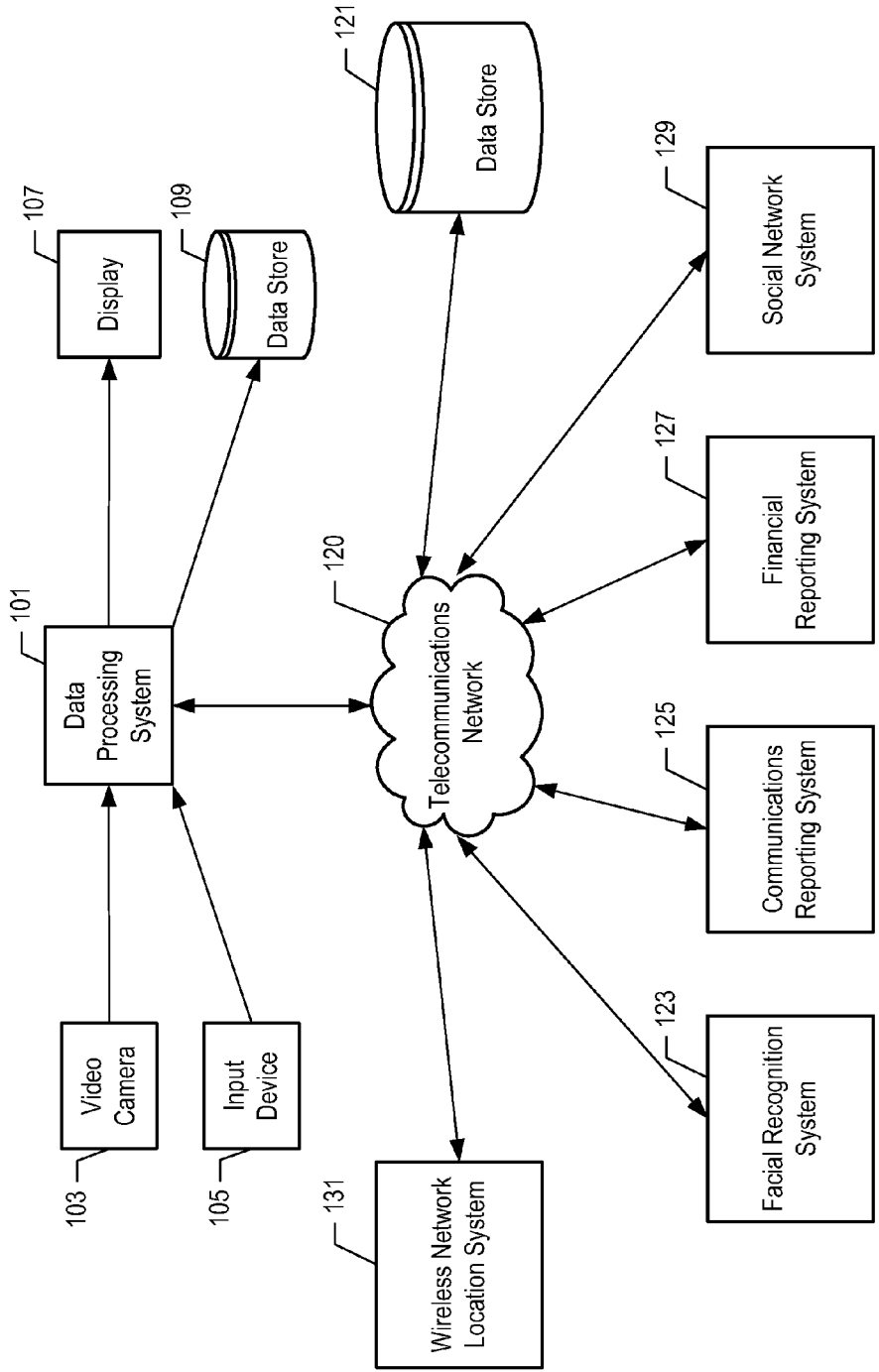
FIG. 1B depicts a block diagram of some salient components of video augmentation system 100 as connected to external systems and data sources, in accordance with an illustrative embodiment of the present invention.
Figure 2:
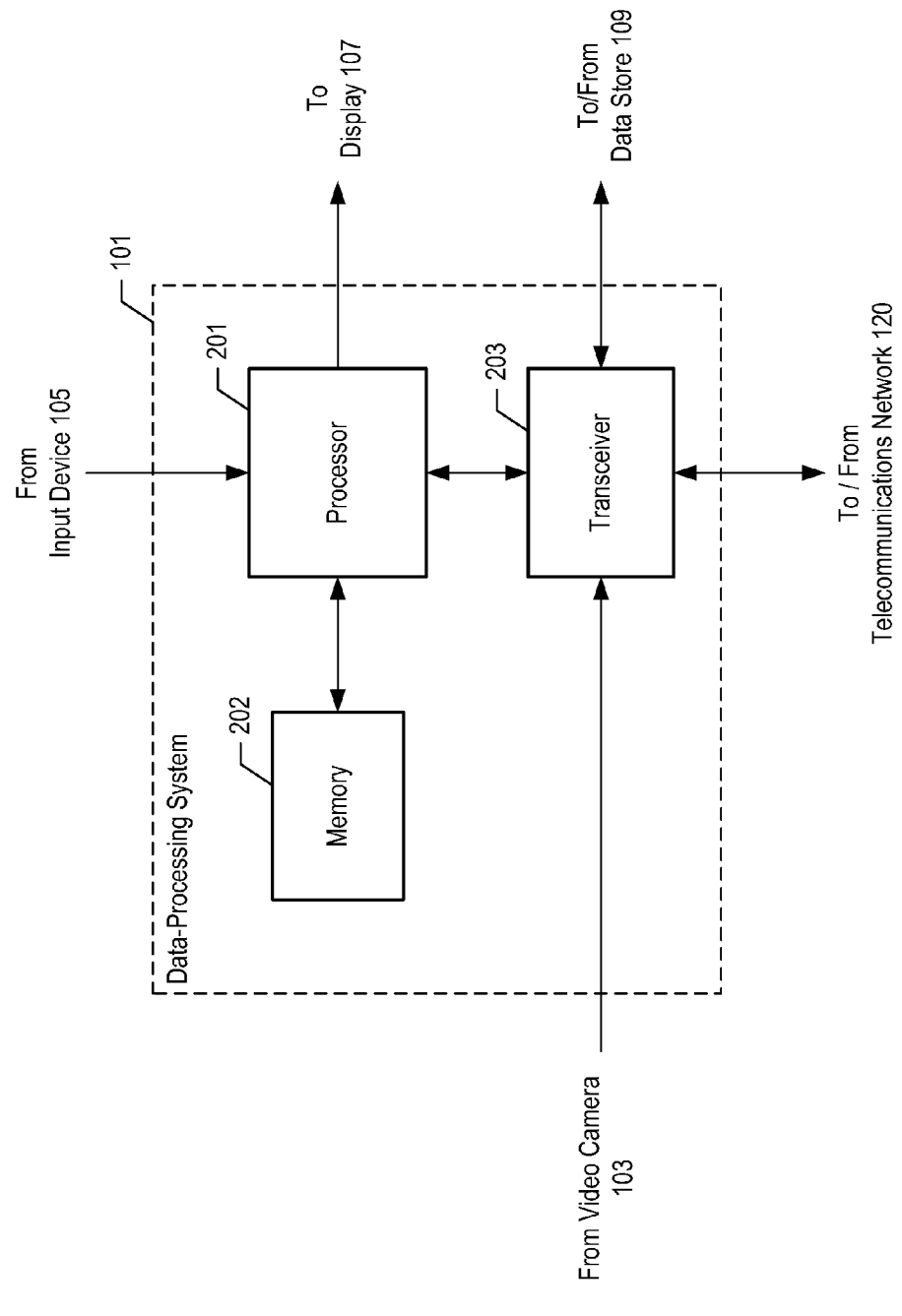
FIG. 2 depicts a block diagram comprising the salient elements of data-processing system 101 according to an illustrative embodiment of the present invention.

Data-processing system 101 is a computer that comprises non-transitory memory, processing component(s), and communication component(s) as described in more detail in FIG. 2. Data-processing system 101 executes and coordinates the salient operations of video augmentation system 100 according to an illustrative embodiment. For example, data-processing system 101 receives the original video signal 111 from video camera 103, processes it according to the methods disclosed herein, generates composite video signal 113, transmits it to display 107 and, for archiving, transmits it to data store 109 and elsewhere. Data-processing system 101, in order to perform some of its functions, also communicates, coordinates, and electronically interacts (wired or wirelessly as appropriate) with systems outside of video augmentation system 100, as described in further detail in FIG. 1B. For example, data-processing system 101 is also connected to a wireless network location system 131, which in some embodiments is the Wireless Location Signatures (WLS™) technology from Polaris Wireless, Inc.

Video camera 103 is well known in the art. Video camera 103 generates an original video signal 111 that depicts the geographic area under the "eye" of video camera 103. Video signal 111 is the video feed from the surveillance camera(s). Video camera 103 transmits video signal 111 to data-processing system 101 in well known fashion.

Input device 105 is well known in the art. Input device 105 enables a user of video augmentation system 100 to interact with the system, for example, enabling the user to:

command video camera 103 to take an action, e.g., move its viewing angle, change its geographical surveillance area, zoom, etc., indicate that a person visible on display 107 is of interest to the user, request supplemental information about a person visible on display 107, including information about the person's identity and/or their mobile units, request reports about a person or persons visible on display 107, request other data and/or reports from data store 109, etc.

Display 107 is well known in the art. Display 107 receives composite video signal 113 from data-processing system 101 and displays the composite video signal in a manner visible to a user.

Data store 109 is an electronic data storage element that is well known in the art. Data store 109 comprises non-transitory memory (e.g., a hard disk, etc.) that is used by video augmentation system 100 to store, archive, and retrieve information. For example, data store 109 receives video signal 111 from data-processing system 101 and archives it; data store 109 receives composite video signal 113 from data-processing system 101 and archives it; data store 109 receives supplemental information from data-processing system 101 and archives it; data store 109 transmits supplemental information data to data-processing system 101 in response to a retrieval request; data store 109 transmits archived composite video signal 113 to data-processing system 101 in response to a retrieval request.

It will be clear to those having ordinary skill in the art after reading the present disclosure that the system illustrated in FIG. 1A can be embodied in different variations that are consistent with the present invention. For example, some embodiments comprise several video cameras that cover a plurality of geographic regions. For example, some embodiments comprise several displays and input devices for a plurality of users. For example, in some embodiments, data store 109 comprises a plurality of data stores or a plurality of data storage technologies (e.g., a cloud-based storage system). For example, in some embodiments, not all depicted components are on-site. For example, in some embodiments, the depicted components are interconnected indirectly, e.g., through servers, gateways, switches, networks, the Internet, etc. It will be clear to those having ordinary skill in the art, after reading the present disclosure, how to make and use video augmentation system 100.

FIG. 1B depicts a block diagram of some salient components of video augmentation system 100 as connected to external systems and data sources, in accordance with an illustrative embodiment of the present invention. In addition to the components depicted in FIG. 1A, in some embodiments, video augmentation system 100 is also connected to components that are external to the system and that provide additional sources and repositories of data. FIG. 1B depicts: video augmentation system 100 according to FIG. 1A; telecommunications network 120; data store 121; facial recognition system 123; communications reporting system 125; financial reporting system 127; social network system 129; and wireless network location system 131. Some embodiments are configured with a plurality of one or more of these external systems. Some embodiments incorporate one or more of these systems within data augmentation system 100.

Telecommunications network 120 is well known in the art. Telecommunications network 120 provides video augmentation system 100 with connectivity to other (external) systems that enable video augmentation system 100 to retrieve data and also to transmit/store/archive data as needed. Telecommunications network 120 has wired and wireless elements. In some embodiments, telecommunications network 120 is the Public Switched Telephone Network; in some embodiments, telecommunications network 120 is the Internet; in some embodiments, telecommunications network 120 is a private data network. It will be clear to those having ordinary skill in the art, after reading the present disclosure, that in some embodiments, telecommunications network 120 can be one or more of the above-mentioned networks, without limitation.

Data store 121 is analogous to, and performs the same functions as, data store 109 described above.

Facial recognition system 123 is well known in the art. Facial recognition system 123 is capable of receiving images extracted from video signal 111 and determining whether an image represents a known person. Facial recognition system 123 is also capable of reporting its results to data-processing system 101, including the identity of the recognized person, several possible identities of the person, several other traits associated with the image of the person, etc.

Communications reporting system 125 is well known in the art. Communications reporting system 125 is capable of receiving queries and requests for communications data from data-processing system 101. Communications data comprises:
  information about an active communication in which a given telecommunications terminal is currently engaged, e.g., an ongoing voice call, text messaging, email, etc.,
  a call record about a past call by the given telecommunications terminal,
  a list of voice calls to/from a certain telephone number,
  a list of text messages to/from a certain mobile telephone number,
  a list of emails to/from a certain email address that is associated with the given telecommunications terminal, etc.

Communications reporting system 125 processes the requests (including retrieving information from other systems) and transmits responsive results to data-processing system 101. Communications reporting system 125 is also capable of storing and archiving communications records, such as call records, etc.

Financial reporting system 127 is well known in the art. Financial reporting system 127 receives queries and requests for data from data-processing system 101, such as requests for financial records involving a given telecommunications terminal or financial records for a given person's identity, e.g., a list of banking transactions that occurred from the telecommunications terminal, a list of banking transactions for a certain person, a list of bank accounts for a certain person, a list of credit cards issued to a certain person, etc. Financial reporting system 127 processes the requests (including retrieving information from other systems) and transmits responsive results to data-processing system 101. Financial reporting system 127 is also capable of storing and archiving financial records.

Social network system 129 is well known in the art. Examples of social network system 129 include Facebook, LinkedIn®, Twitter, and other meta-systems that extract, report, and store data from these individual systems. Social network system 129 receives queries and requests for data from data-processing system 101, such as a person's list of "friends" or "connections" on the social network system, a person's information about themselves posted on the social network system, a person's list of people they are following on the social network system, etc. Social network system 129 processes the requests (including retrieving information from other systems) and transmits responsive results to data-processing system 101.

Wireless network location system 131 is well known in the art and is connected to a wireless network that covers the geographic region under surveillance by video augmentation system 100 (the wireless networks that cover the surveilled region are not shown in the present figure for the sake of simplicity). A wireless network location system 131 deployed in a wireless network analyzes data that are available from the network infrastructure and from the mobile units served by the network and estimates, to a certain resolution, the location of the mobile units in the network. In the present illustration, wireless network location system 131 is a Serving Mobile Location Center ("SMLC") operating in a GSM wireless network. A GSM SMLC computes estimates of the locations of mobiles in the network. An example of a wireless network location system 131 that is an SMLC is the Wireless Location Signature (WLS™) service from Polaris Wireless, Inc., which performs a mass location analysis that provides relatively high-resolution location estimates for large numbers of mobile units in a given geographic area covered by the wireless network.

It will be clear to those having ordinary skill in the art, after reading the present disclosure, how to make and use alternative embodiments of the present invention that operate in a non-GSM wireless network. Typically, each wireless network has its own wireless network location system 131 that connects to video augmentation system 100, but in some embodiments of the present invention, wireless network location system 131 is an aggregator of location data available from all the relevant wireless networks. Moreover, in some embodiments, data-processing system 101 comprises a data aggregation function that receives and integrates location data from a plurality of wireless network location systems 131.

Other external systems can also connect to video augmentation system 100, but are not depicted in FIG. 1B—for example:
  a database of surveillance records;
  a public records database, such as real estate taxation maps;
  a criminal records database;
  etc.

In addition to being sources of information for video augmentation system 100, the above-recited systems also are capable of receiving, storing, and archiving information transmitted to them by video augmentation system 100. It will be clear to those having ordinary skill in the art after reading the present disclosure that the system illustrated in FIG. 1B can be embodied in many variations that are consistent with the present invention. For example, in some embodiments, video augmentation system 100 comprises one or more of components 121-131 and/or other above-mentioned systems. It will be clear to those having ordinary skill in the art, after reading the present disclosure, how to make and use video augmentation system 100 according to FIG. 1B.

FIG. 2 depicts a block diagram comprising the salient elements of data-processing system 101 according to an illustrative embodiment of the present invention. Data-processing system 101 comprises: processor 201; memory 202; transceiver 203; and communication paths to video camera 103, input device 105, display 107, data store 109, and telecommunications network 120.

Data-processing system 101 executes and coordinates the salient operations of video augmentation system 100 as explained in more detail below and in the accompanying figures. Data processing system 101 comprises the hardware necessary to execute software, receive data, transmit data, and process data such that it can perform the operations described herein.

Processor 201 is a processing device such as a microprocessor that, in conjunctions with the other components in data-processing system 101, is capable of executing the software and processing the data according to the operations described herein. Processor 201 receives user input via input device 105 and, after processing, transmits composite video signals to display 107. Processor 201 is well known in the art.

Memory 202 is non-transitory memory that stores program code and data sufficient to enable the execution of software and data processing according to the operations recited herein. Memory 202 is well known in the art.

Transceiver 203 is a component that enables data-processing system 101 to communicate electronically (whether in a wired or wireless configuration) with other components internal and external to video augmentation system 100, including receiving video signals from camera 103; and transmitting to and from data store 109 and external systems via telecommunications network 120. Transceiver 203 is well known in the art.

It will be clear to those having ordinary skill in the art, after reading the present disclosure, that data-processing system 101 can be embodied as a multi-processor platform, as a server, as a sub-component of a larger computing platform, or in some other computing environment—all within the scope of the present invention. It will be clear to those having ordinary skill in the art, after reading the present disclosure, how to make and use data-processing system 101.

FIG. 3A depicts illustrative frame 301 of video signal 111 according to an illustrative embodiment of the present invention. Video signal 111 is transmitted by video camera 103 and captures a certain geographic area covered by the camera's "eye." Video signal 111 is a video feed that is well known in the art. Video signal 111 carries a plurality of video frames, including illustrative frame 301.

Frame 301 comprises: image 303; mobile phone 305; background landscape 320; and foreground landscape 330.

Image 303 depicts a person in a manner well known in the art. Image 303 is an image of a person in the geographic region monitored by video camera 103.

Mobile phone 305 is (illustratively) a GSM cellular telephone that is carried by the person in image 303. It will be clear to those having ordinary skill in the art, after reading the present disclosure, that mobile phone 305 is well known in the art and can be any type of wireless telecommunications terminal, including a cellular telephone (e.g., CDMA, GSM, UMTS, etc.), smartphone (e.g., iPhone, Android, Blackberry, etc.), mobile computing tablet (e.g., iTouch, Kindle Fire, iPad, etc.), or a combination thereof, or other mobile unit. Voice capabilities are not required according to the present invention, although as is evident from the illustrative examples, the mobile phones depicted herein support voice calls. Mobile phone 305 (and others discussed herein) is referred to synonymously as "mobile" or "mobile unit" or "wireless telecommunications terminal" or "user endpoint" or "user equipment." It will be clear to those having ordinary skill in the art, after reading the present disclosure, that video augmentation system 100 operates with more than one type of wireless network, so that different kinds of mobiles 305 from different networks can operate with the system. Although mobile 305 is clearly depicted (and not to scale) in FIG. 3A, it is not necessary for mobile 305 to be visible in frame 301.

Location 307 is a geographic area that comprises both the person in image 303 and, impliedly, the mobile phone that the person carries, i.e., mobile 305. For purposes of the present disclosure, location 307 is the location of the person in image 303 as determined by data-processing system 101. In other words, data-processing system 101 can resolve location 307 for image 303 within the known geographic area that is under surveillance by camera 103.

Location 307 is expressed in latitude and longitude coordinates with a resolution (or confidence) factor, e.g., 10-meter radius. The precision (resolution, confidence, probability distribution) with which location 307 is known, determined, and expressed depends on the implementation of the embodiment of the surveillance subsystem of video augmentation system 100. It should also be noted that the precision with which location 307 is expressed need not be the same as the precision of the estimated location of the mobile that is typically obtained from wireless network location system 131. For example, the resolution of location 307 can be a lat/long with a 2-meter radius, while the estimated location of mobile 305 can be a 10-meter by 10-meter square having a certain probability. The discussion below in regard to operation 803 discusses the relationship between these parameters in more detail.

Background landscape 320 illustratively depicts objects that appear in frame 301 in the background relative to image 303. Background landscape 320 illustratively depicts a plurality of buildings.

Foreground landscape 330 illustratively depicts objects that appear in frame 301 in the foreground relative to image 303. Foreground landscape 330 illustratively depicts a tree and a picnic table.

It will be clear to those having ordinary skill in the art, after reading the present disclosure, that frame 301 is merely illustrative of a frame received from a video camera feed that covers a certain geographic region, and that in alternative embodiments, any number of images of persons could appear with any number of backgrounds and foregrounds, wherein each person could carry any number of mobile phones. Some of the later examples illustrated herein are based on a variation of frame 301 that comprises images of more than one person, but which is not shown here for the sake of simplicity.

FIG. 3B depicts illustrative frame 311 of composite video signal 113 in accordance with an illustrative embodiment of the present invention. Composite video signal 113 is generated by data-processing system 101 according to the methods and operations recited herein, and comprises a plurality of frames including illustrative frame 311.

Frame 311 comprises: image 303; mobile phone 305; tag 315; background landscape 320; and foreground landscape 330. Frame 311 is based on frame 301 depicted in FIG. 1A. Image 303, mobile phone 305, background landscape 320, and foreground landscape 330 are the same as depicted in FIG. 1A. Likewise, location 307 is the location of the person in image 303. According to the present depiction, the coordinates of location 307 are not displayed in frame 311, but it will be clear to those having ordinary skill in the art, after reading the present disclosure, how to construct frame 311 such that it comprises the coordinates of location 307.

Tag 315 comprises a depiction of: the identity of the person in image 303, e.g., the person's name; the person's address; and the person's Social Security Number. Tag 315 is an element of frame 311 that has been generated by data-processing system 101 according to the operations recited herein. By positioning tag 315 proximate to image 303, data-processing system 101 creates an association between the image of the person and tag 315 including its constituent information that is visible to a human operator. The system also captures the association in a data structure for storage, transmission, and archiving.

It will be clear to those having ordinary skill in the art, after reading the present disclosure that frame 311 and tag 315 are merely illustrations, and that many other embodiments are possible to represent, within frame 311, various aspects of the identity of the person in image 303. For example, other personal information might be displayed, including a nickname, a date of birth, etc.—presented in one or more tags. Many variations are possible within the scope of the present invention.

Figure 4:
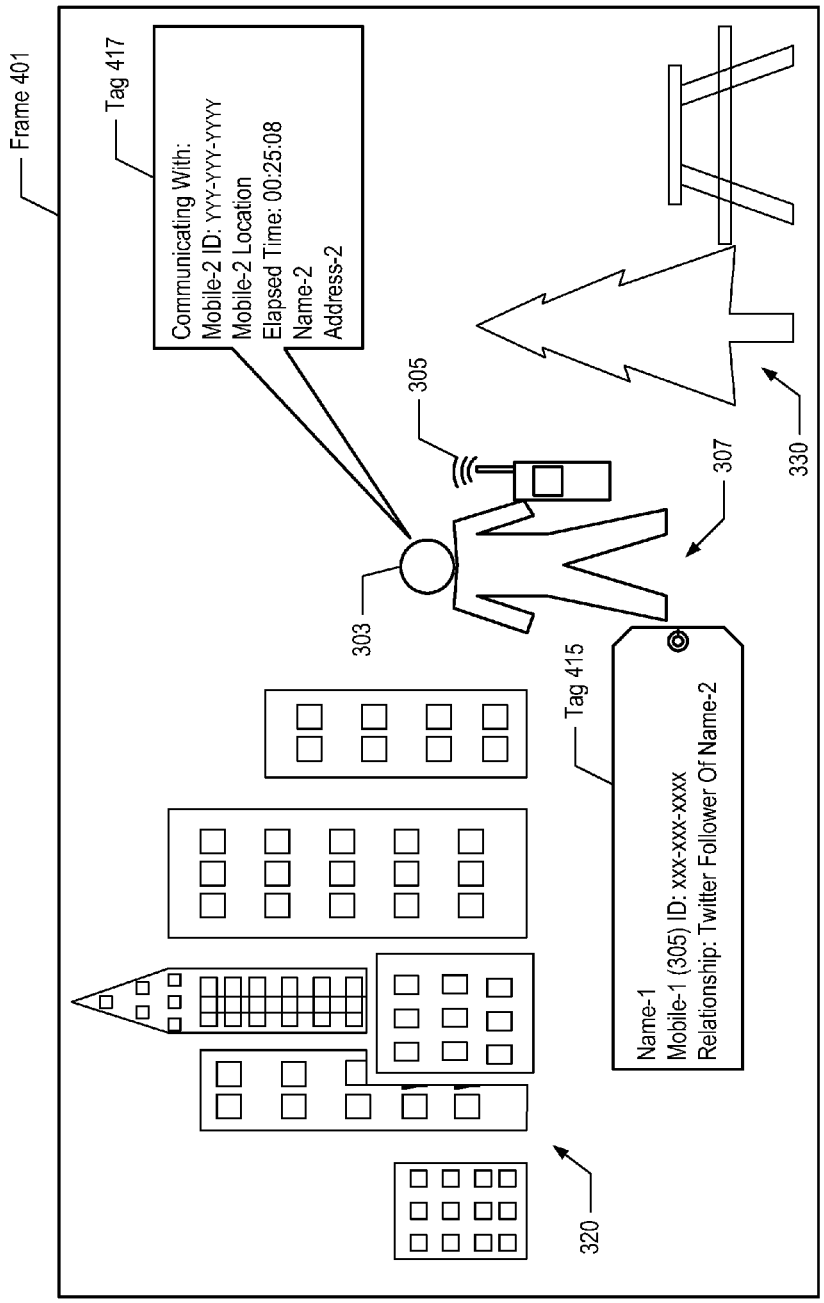
FIG. 4 depicts an illustrative frame of composite video signal 400 in accordance with an illustrative embodiment of the present invention.

FIG. 4 depicts illustrative frame 401 of composite video signal 400 in accordance with an illustrative embodiment of the present invention. Composite video signal 400 is generated by data-processing system 101 according to the methods and operations recited herein and comprises a plurality of frames including illustrative frame 401. Frame 401 is based on frame 301 depicted in FIG. 1A.

Frame 401 comprises: image 303; mobile phone 305; background landscape 320; foreground landscape 330; tag 415; and tag 417. Image 303, mobile phone 305, background landscape 320, and foreground landscape 330 are the same as depicted in FIG. 1A. Likewise, location 307 is the location of the person in image 303.

Tag 415 comprises a depiction of: the identity of the person in image 303 shown here as the person's name (Name-1); the identity of mobile phone 305 shown here as the telephone number (xxx-xxx-xxxx); and the person's "social" relationship or social network connection to another party identified here by Name-2. Tag 415 is an element of frame 401 that has been generated by data-processing system 101 according to the operations recited herein. By positioning tag 415 proximate to image 303, data-processing system 101 creates a visible association between the image of the person and tag 415 including its constituent information that is visible to a human operator. The system also captures the association in a data structure for storage, transmission, and archiving.

Tag 417 comprises information about another party who is communicating with the person in image 303, but the other party is not visible in the frame. Tag 417 comprises: an indication ("communicating with") that there is an active communication between the person in image 303 and another party; the identity of the other party's mobile (yyy-yyy-yyyy); an estimate of the location of the other party's mobile; the elapsed time of the active communication; the name that is associated with the other party's mobile, e.g., the subscriber of mobile yyy-yyy-yyyy (Name-2); and a known home address of the other party. Tag 417 is an element of frame 401 that has been generated by data-processing system 101 according to the operations recited herein.

FIG. 5A depicts illustrative frame 501 of composite video signal 500 according to an illustrative embodiment of the present invention. Composite video signal 500 is generated by data-processing system 101 according to the methods and operations recited herein and comprises a plurality of frames including illustrative frame 501.

Frame 501 comprises: image 303; mobile phone 305; tag 515; background landscape 320 (not labeled); and foreground landscape 330 (not labeled). Frame 501 is based on frame 301 depicted in FIG. 1A. Image 303, mobile phone 305, background landscape 320, and foreground landscape 330 are the same as depicted in FIG. 1A. Likewise, location 307 (not labeled) is the location of the person in image 303.

Tag 515 comprises: a depiction of the identity of the person in image 303 (Name-1); an identity of mobile phone 305 (xxx-xxx-xxxx); a familial relationship to another person identified as Name-2 but not appearing in this frame (Brother of Name-2); a "communication" relationship to Name-2, having texted Name-2 at a certain date and time; a "social" relationship with Name-2 on Twitter; a financial relationship to Name-2, having transferred a substantial sum of money to Name-2 on a certain date and time. Tag 515 is an element of frame 501 that has been generated by data-processing system 101 according to the operations recited herein. By positioning tag 515 proximate to image 303, data-processing system 101 creates a visible association between the image of the person and tag 515 including its constituent information that is visible to a human operator. The system also captures the association in a data structure for storage, transmission, and archiving.

FIG. 5B depicts illustrative frame 521 of composite video signal 520 according to an illustrative embodiment of the present invention. Composite video signal 520 is generated by data-processing system 101 according to the methods and operations recited herein and comprises a plurality of frames including illustrative frame 521.

Frame 521 comprises the same information as frame 501 and is presented here to show an alternative view of how data-processing system 101 prepares a composite video signal for presentation to users/operators of video augmentation system 100. Frame 521 comprises: sub-frame 523 and tag 525.

Sub-frame 523 is identical in content to frame 301.

Tag 525 comprises the same information as tag 515.

In frame 521, tag 525 and sub-frame 523 are positioned side-by-side. It will be clear to those having ordinary skill in the art, after reading the present disclosure, how to devise many other variations of frame 501 and frame 521.

Figure 6A:
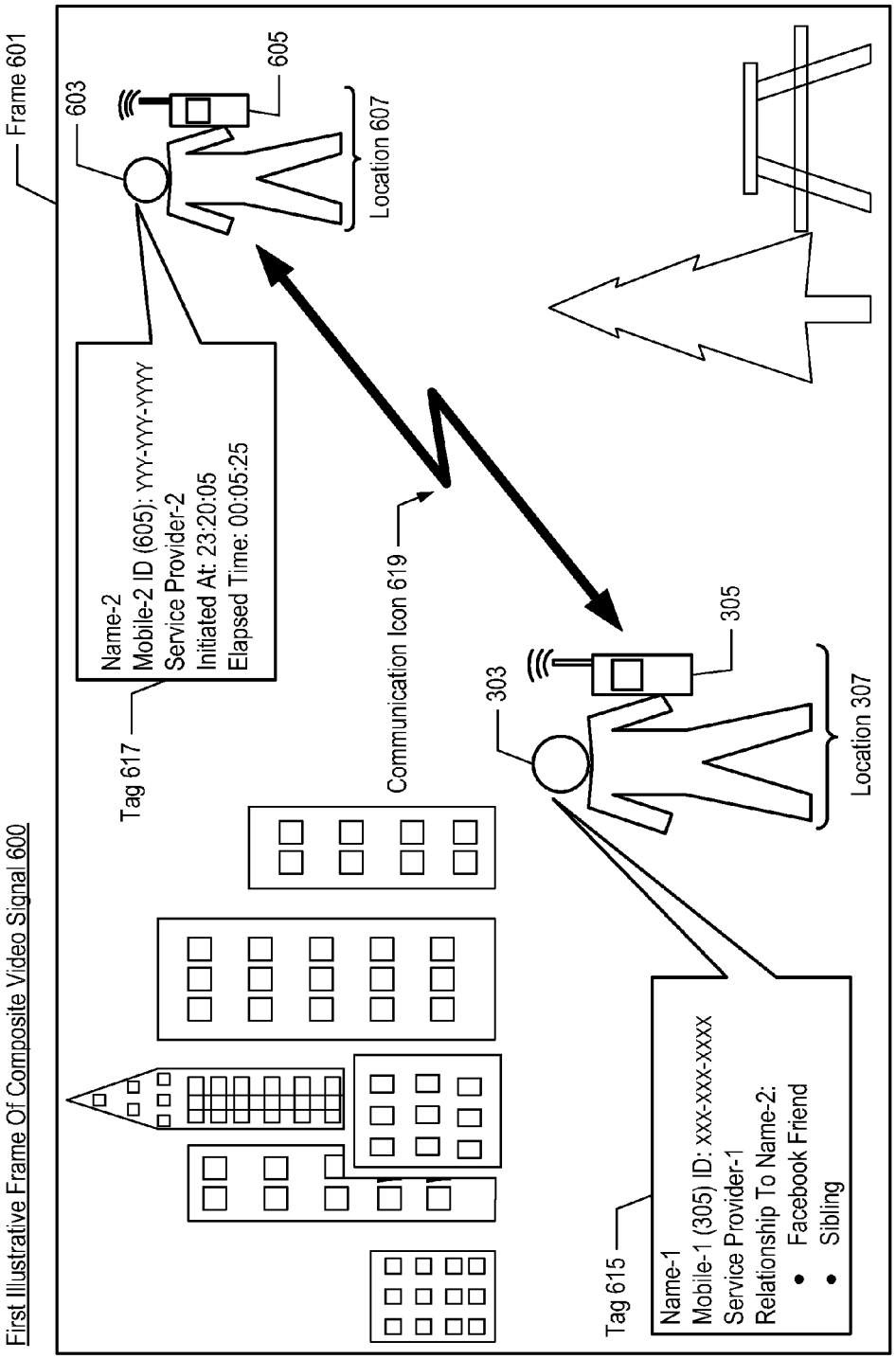
FIG. 6A depicts a first illustrative frame of composite video signal 600 according to an illustrative embodiment of the present invention.

FIG. 6A depicts a first illustrative frame (601) of composite video signal 600 according to an illustrative embodiment of the present invention. Composite video signal 600 is generated by data-processing system 101 according to the methods and operations recited herein and comprises a plurality of frames including illustrative frame 601.

Frame 601 comprises: image 303; mobile phone 305; background landscape 320 (not labeled); foreground landscape 330 (not labeled); image 603; mobile phone 605; tag 615; tag 617; and communication icon 619. Image 303, mobile phone 305, background landscape 320, and foreground landscape 330 are the same as depicted in FIG. 1A. Likewise, location 307 is the location of the person in image 303. Frame 601 is based on a variation of frame 301 that would show more than one person appearing in the frame.

Image 603 depicts a person in a manner well known in the art. Image 603 is an image of a person in the geographic region monitored by video camera 103.

Mobile phone 605 is (illustratively) a GSM cellular telephone that is carried by the person in image 603. Mobile phone 605 is analogous, though not necessarily identical, to mobile 305. Thus, mobile phone 605 is well known in the art and can be any type of mobile unit, including a cellular telephone (e.g., CDMA, GSM, UMTS, etc.), smartphone (e.g., iPhone, android, Blackberry, etc.), mobile computing tablet (e.g., iTouch, Kindle Fire, iPad, etc.), or other mobile unit. In some embodiments, mobile 305 operates within a first wireless network that is different than a second wireless network in which mobile 605 operates.

Location 607 is the location of the person in image 603. According to the present depiction, the coordinates of location 307 and 607 are not displayed in frame 601, but it will be clear to those having ordinary skill in the art, after reading the present disclosure, how to generate frame 601 such that it comprises the coordinates of location 307 and/or location 607.

Tag 615 comprises: a depiction of the identity of the person in image 303 (Name-1); an identity of mobile phone 305 (xxx-xxx-xxxx); an identity of the service provider (wireless network operator) that services mobile 305 (Service Provider-1); a "social" relationship on Facebook to another person identified as Name-2, e.g., "Facebook Friend"; and a familial relationship with Name-2, e.g., sibling. By positioning tag 615 proximate to image 303 as depicted here, data-processing system 101 creates an association between image 303 of the first person and tag 615 including its constituent information that is visible to a human operator. The system also captures the association in a data structure for storage, transmission, and archiving.

Tag 617 comprises: a depiction of the identity of the person in image 603 (Name-2); an identity of mobile phone 605 (yyy-yyy-yyyy); an identity of the service provider (wireless network operator) that services mobile 605 (Service Provider-2); a call origination time; and an elapsed time for the call. By positioning tag 617 proximate to image 603 as depicted here, data-processing system 101 creates an association between image 603 of the second person and tag 617 including its constituent information that is visible to a human operator. The system also captures the association in a data structure for storage, transmission, and archiving.

Communication icon 619 depicts the fact that an active communication is occurring between mobile 305 and mobile 605. Icon 619 indicates that a voice call is connected and active. It will be clear to those having ordinary skill in the art, after reading the present disclosure, when and how to depict a communication icon between two parties that are actively texting each other; or are actively IM'ing each other; or are engaged in another collective communication such as an online application, an online game, etc. For example, communication icon 619 could be depicted when mobile 305 and mobile 605 exchange text messages within a predetermined time threshold such as within 1 minute.

Figure 6B:
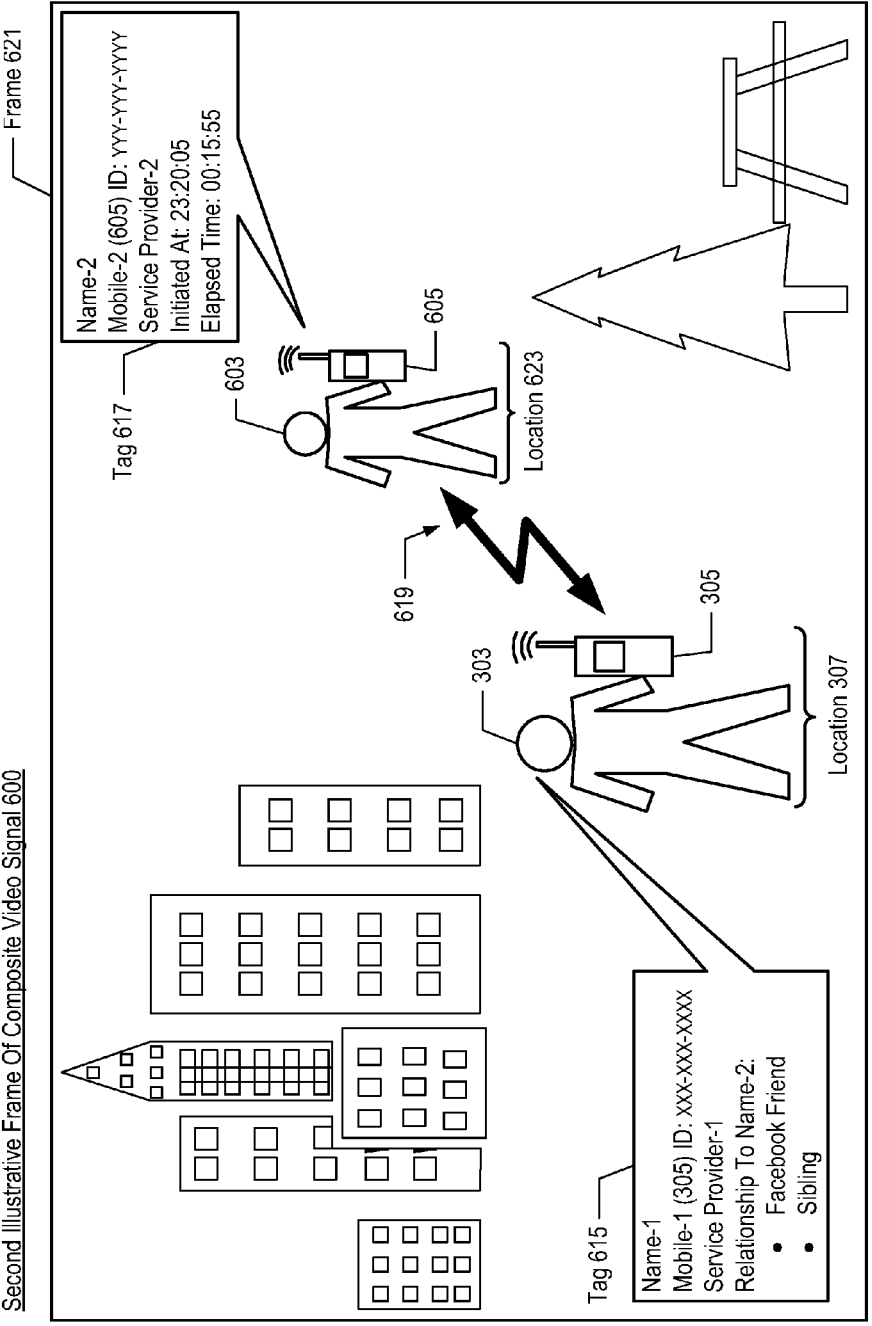
FIG. 6B depicts a second illustrative frame of composite video signal 600 according to an illustrative embodiment of the present invention.

FIG. 6B depicts a second illustrative frame (621) of composite video signal 600 according to an illustrative embodiment of the present invention. Composite video signal 600 is generated by data-processing system 101 according to the methods and operations recited herein and comprises a plurality of frames including illustrative frame 621. Frame 621 is based on a variation of frame 301 that would show more than one person appearing in the frame.

Frame 621 comprises the same elements as frame 601, but frame 621 depicts image 603 and mobile 605 at a different location, i.e., at location 623. In other words, in frame 621, the person in image 603 has moved (from location 607 in frame 601) to location 623.

Figure 6C:
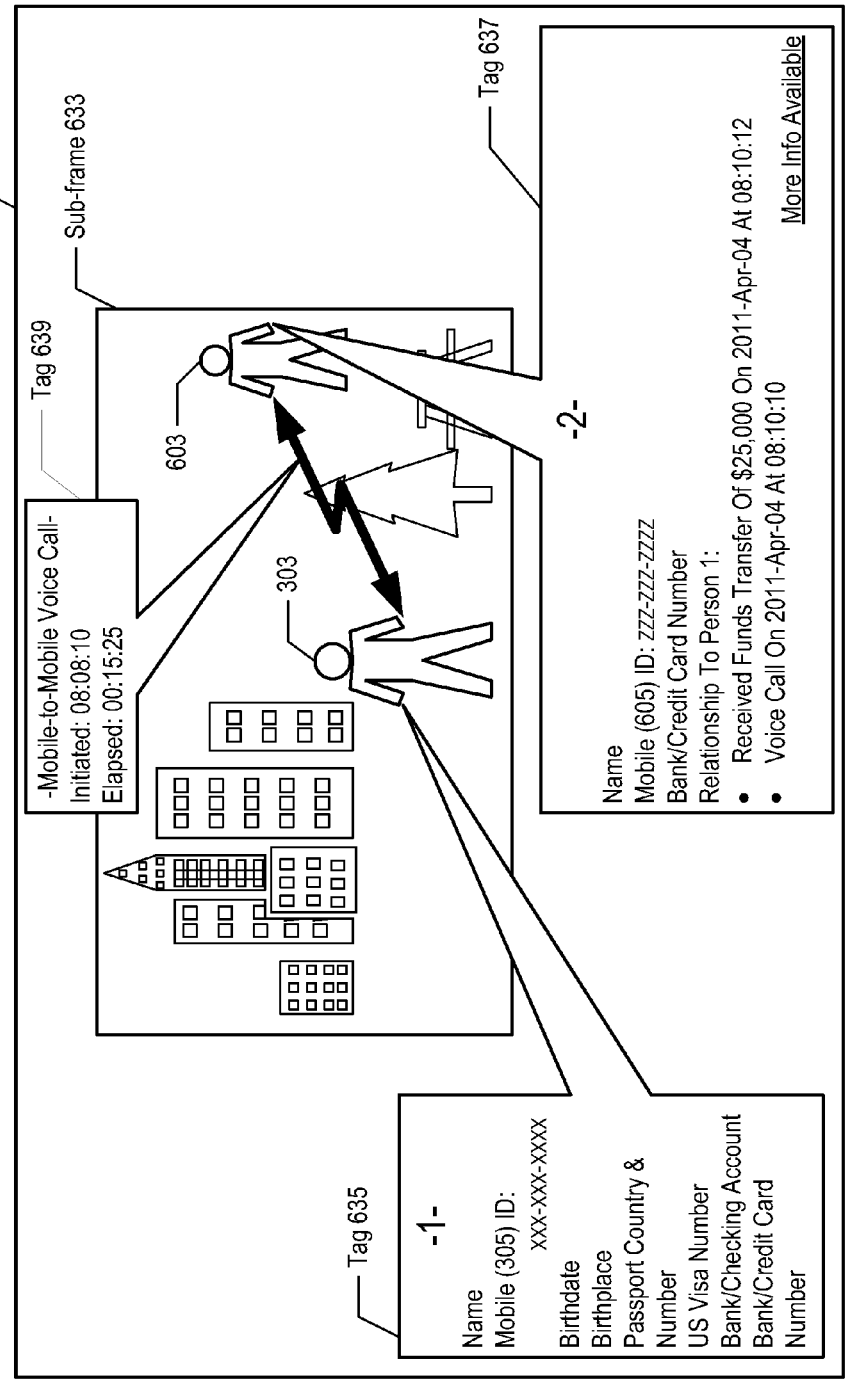
FIG. 6C depicts a third illustrative frame of composite video signal 600 according to an illustrative embodiment of the present invention.

FIG. 6C depicts a third illustrative frame (631) of composite video signal 600 according to an illustrative embodiment of the present invention. Composite video signal 600 is generated by data-processing system 101 according to the methods and operations recited herein and comprises a plurality of frames including illustrative frame 631. Frame 631 is based on a variation of frame 301 that would show more than one person appearing in the frame.

Frame 631 comprises: sub-frame 633; tag 635; tag 637; and tag 639.

Sub-frame 633 is similar, but not identical, to frame 601 in FIG. 6A. Sub-frame 633 comprises: image 303; background landscape 320 (not labeled); foreground landscape 330 (not labeled); image 603; and communication icon 619 (not labeled). Image 303, mobile phone 305 (not shown), background landscape 320, foreground landscape 330, image 603, terminal 605 (not shown), and communication icon 619 are the same as depicted/described earlier. Likewise, location 307 (not labeled) is the location of the person in image 303; location 607 (not labeled) is the location of the person in image 603.

Tag 635 comprises: the number "1" illustratively labeling the person in image 303 as the first party; and information about the first party, including name, the identity of mobile 305 (not shown in frame 631 but associated with the first party), birthdate, birthplace, passport country and passport number, U.S. visa number, bank and checking account number, bank and credit card number.

Tag 637 comprises: the number "2" illustratively labeling the person in image 603 as the second party; and information about the second party, including name, the identity of mobile 605 (not shown in frame 631 but associated with the second party), bank and credit card number, a list of relationships between the second party and the first party, including a financial relationship in which the second party received $25,000 at a certain date/time, and a "communication" relationship in which the second party and the first party had a voice call at a certain date/time.

Tag 639 comprises: an indication that the person in image 303 and the person in image 603 are engaged in a mobile-to-mobile call initiated at a certain time and having a certain elapsed time.

In regard to the illustrative frames depicted in FIGS. 3 through 6C, it will be clear to those having ordinary skill in the art, after reading the present disclosure, that the depicted frames and their constituent elements are merely illustrative and that many other variations are possible within the scope of the present invention.

Figure 7:
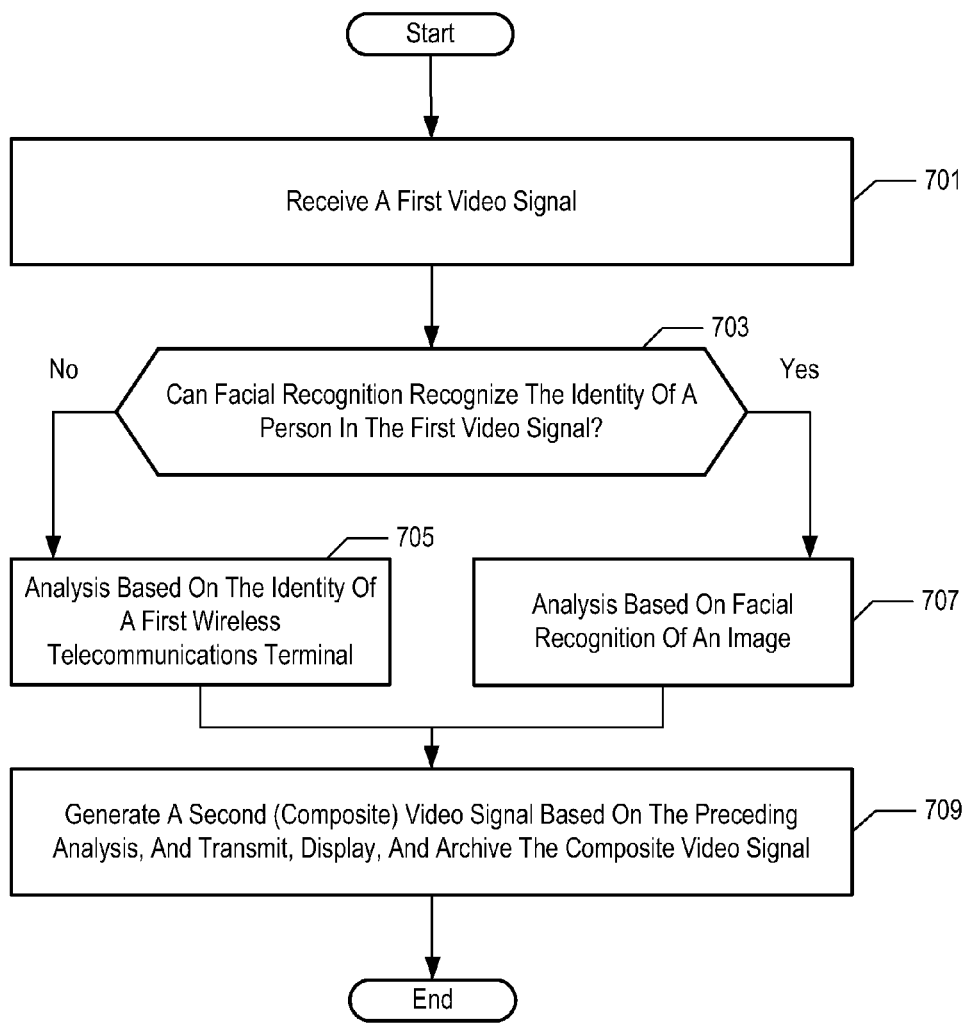
FIG. 7 depicts a flowchart of the salient operations of illustrative method 700 in accordance with an illustrative embodiment of the present invention.

FIG. 7 depicts a flowchart of the salient operations of illustrative method 700 in accordance with an illustrative embodiment of the present invention. In general, data-processing system 101 performs the operations of method 700 and its sub-operations, unless expressly recited otherwise. It will be understood that, because data-processing system 101 is a computer, the recited operations executed by data-processing system 101 (e.g., processing, determining, estimating, retrieving, generating, polling, etc.) comprise a plurality of data processing operations such as calculating, computing, encoding, decoding, transmitting, receiving, comparing, etc.—as appropriate to process data and produce a useful result according to the disclosed methods herein.

At operation 701, data-processing system 101 receives a first video signal, e.g., video signal 111 from video camera 103, in a manner well known in the art.

Operation 703 is a decision point asking whether facial recognition can recognize the identity of one or more persons in the first video signal, e.g., can facial recognition system 123 recognize the identity of the person in image 303. In other words, is a given image of a person sufficient for the system to recognize and identify the person? If not, control passes to operation 705. If yes, control passes to operation 707.

At operation 705, for the one or more persons appearing in a frame who cannot be recognized via facial recognition, data-processing system 101 performs an analysis that is based on the identity of a mobile phone that is inferred to be co-located with the person, as described in more detail below.

At operation 707, for the one or more persons who can be recognized via facial recognition, data-processing system 101 performs an analysis based on the facial recognition of the image of the respective person, as described in more detail below.

At operation 709, based on the preceding analysis (operation 705 and/or operation 707) data-processing system 101 generates a second video signal that is a composite video, and further transmits, displays, and archives the composite video signal. This operation is described in more detail in FIG. 14 below and in the accompanying text.

It will be clear to those having ordinary skill in the art, after reading the present disclosure, how to generate and execute method 700 according to the present invention. It will be clear to those having ordinary skill in the art that some of the operations and/or sub-operations of method 700 can be performed in parallel with each other or in a different order than those depicted herein without departing from the scope of the present invention.

Figure 8:
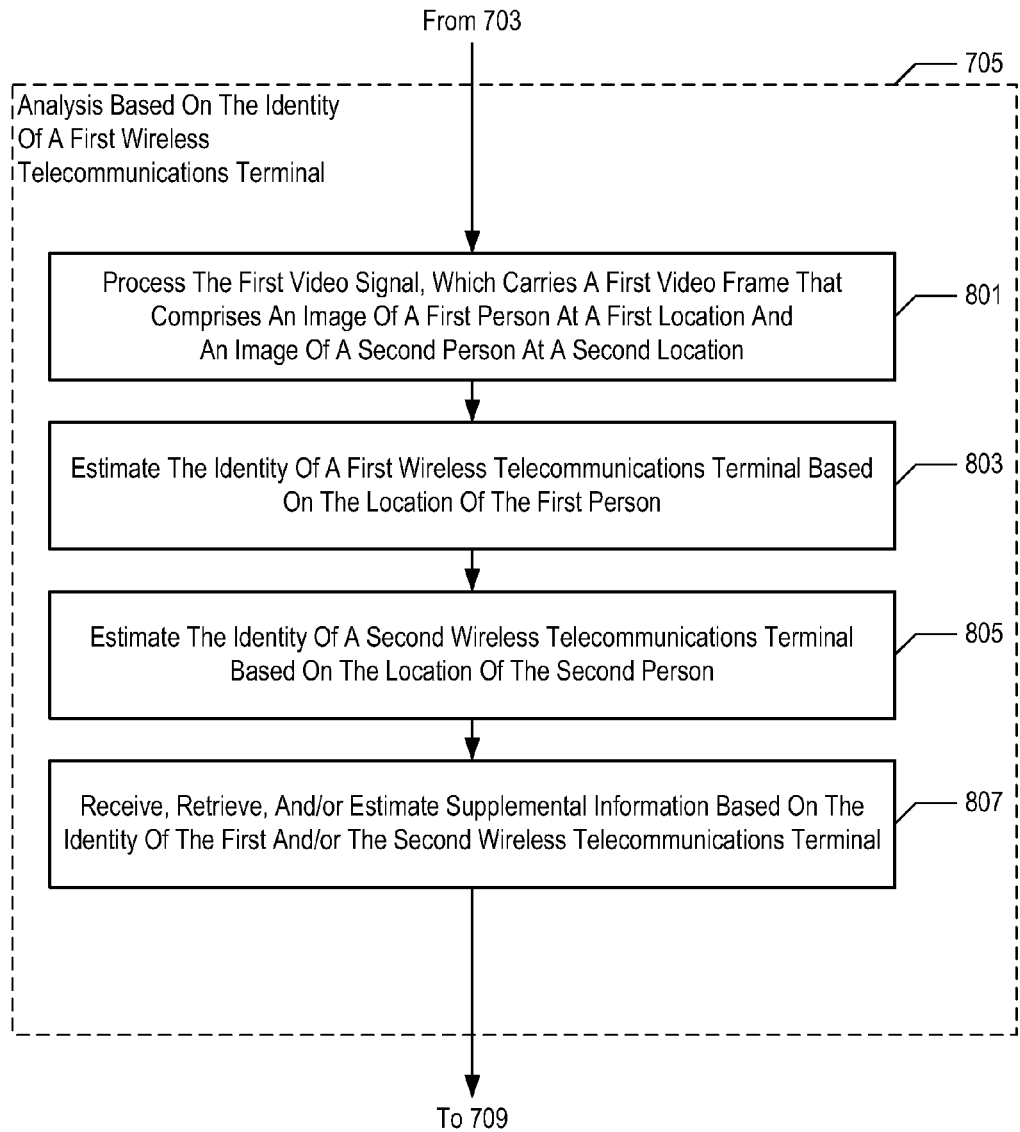
FIG. 8 depicts a flowchart of the salient operations of illustrative operation 705 in accordance with an illustrative embodiment of the present invention.

FIG. 8 depicts a flowchart of the salient operations of operation 705 in accordance with an illustrative embodiment of the present invention.

At operation 801, data-processing system 101 processes the first video signal, which carries a first video frame, e.g., video signal 111 carrying video frame 301. The first video frame comprises an image of a first person at a first location and an image of a second person at a second location, e.g., image 303 at location 307 and image 603 at location 607 (in a variation of frame 301 that would show more than one person appearing in the frame). As previously noted, within the geographic area under surveillance by video camera 103, every location is known or determined by data-processing system 101; therefore, when data-processing system 101 detects an image of a person in the frame of a video signal, data-processing system 101 determines a location for that person. Thus, illustratively, data-processing system 101 determines the location of the person in image 303, i.e., data-processing system 101 determines location 307.

At operation 803, data-processing system 101 estimates the identity of a first mobile phone based on the location of the first person, e.g., estimating the identity of mobile 305 based on location 307 for the person in image 303. Estimating the identity of a mobile is based in part on the estimated location of the mobile, which is available (illustratively) from wireless network location system 131.

In some illustrative embodiments, data-processing system 101 performs the estimation of the mobile's identity. For example, in operation 801, data-processing system 101 determined a location for the image of the person, i.e., data-processing system 101 determined location 307. In the present operation, data-processing system 101 requests location data from one or more wireless network location systems 131 that serve the geographic area under surveillance by video camera 103—particularly requesting location data that corresponds to location 307. Equipment deployed in the polled wireless network(s), e.g., wireless network location systems 131, analyzes data that are available from network infrastructure and from mobile units to estimate a location for each mobile unit in the network. For example, the Wireless Location Signature (WLS™) service from Polaris Wireless, Inc. performs ongoing mass location analysis that provides relatively high-resolution location data for large numbers of mobile units in a given geographic area. Location information from wireless network location systems 131 is transmitted to data-processing system 101, which then estimates which, if any, of the mobiles in the surveillance area corresponds to the location of the person in the surveillance frame, e.g., location 307. Thus, data-processing system 101 determines whether any mobiles can be inferred to be at location 307. When a sufficient match or correlation exists as between mobile location estimate(s) and location 307, data-processing system 101 infers that the person at location 307 carries the matching mobile. The identity of the mobile, e.g., the mobile telephone number, is known from the location data received from wireless network location system 131. Because the identity of the mobile is known, data-processing system 101 associates the identity of the mobile with the person in image 303 appearing at location 307. In this way, illustratively, data-processing system 101 estimates the identity of mobile 305 based on location 307 of the person in image 303.

As noted above in describing location 307 in respect to FIG. 3A, the precision of location 307 can differ substantially from the precision of the estimate of the location of the mobile as received from wireless network location systems 131. Nevertheless, data-processing system 101 comprises stored-program software comprising algorithms that compute the necessary correlations as between the estimated location of the mobile and the estimated location of the person in the image, e.g., location 307 to determine whether a given mobile corresponds to location 307. The confidence parameters to determine when a correlation is sufficient for data-processing system 101 to infer that a given mobile is co-located with a given person are left to the discretion of the implementers of the illustrative embodiment.

This scenario is merely illustrative of one way to estimate the identity of a first mobile phone based on the location of the first person in the video frame, but it will be clear to those having ordinary skill in the art, after reading the present disclosure, how to make and use alternative embodiments that perform this operation within the scope of the present invention.

At operation 805, as described in detail in operation 803, the identity of a second mobile phone is estimated based on the location of the second person in the frame. Thus, illustratively, data-processing system 101 estimates the identity of mobile 605 based on location 607 of the person in image 603.

At operation 807, data-processing system 101 receives, retrieves, and estimates supplemental information based on the identity of the first and the second mobile phones. This operation is described in more detail below.

Figure 9:
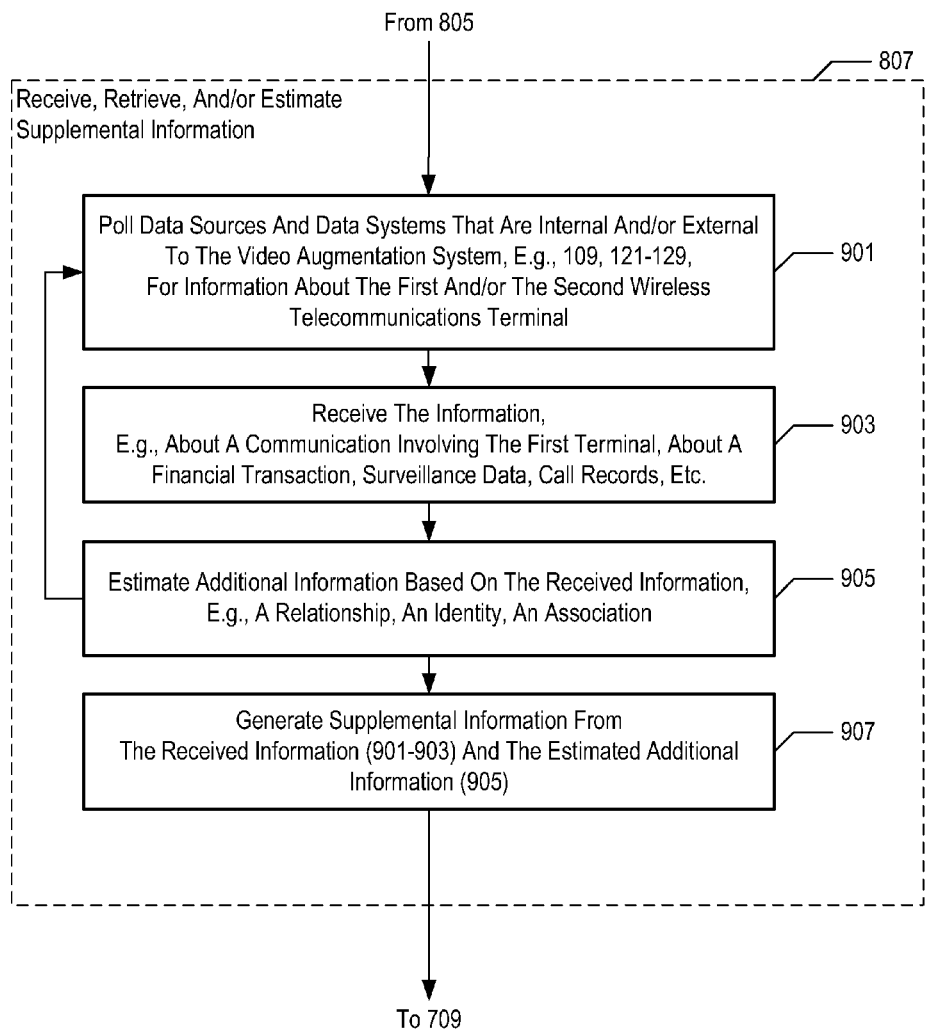
FIG. 9 depicts a flowchart of the salient operations of illustrative operation 807 in accordance with an illustrative embodiment of the present invention.

FIG. 9 depicts a flowchart of the salient operations of illustrative operation 807 in accordance with an illustrative embodiment of the present invention.

At operation 901, data-processing system 101 polls data sources and data systems for information about the first and second mobile phone, whose identities were estimated in earlier operations. The data sources and data systems being polled are internal and/or external to video augmentation system 100. In an illustrative embodiment, data-processing system 101 polls each of data store 109, data store 121, communication reporting system 125, financial reporting system 127, and social network system 129 for information about mobile 305 and mobile 605.

At operation 903, data-processing system 101 receives the polling results. Illustratively, data-processing system 101 receives information comprising:

a currently active communication involving mobile 305—received from communication reporting system 125;

a financial transaction involving mobile 305—received from financial reporting system 127;

surveillance information previously collected and previously saved about mobile 305—received from data store 109 and data store 121; and a call record of a past call involving mobile 305—received from communication reporting system 125.

At operation 905 (described in more detail in the next figure) data-processing system 101 estimates, based on the information received in the previous operation, additional information such as a relationship, an identity, and/or an association. Illustratively, data-processing system 101 estimates the following examples of "additional information:"

an identity of the person in image 303 from wireless network records indicating the identity of the subscriber who owns mobile 305, e.g., Name-1;

a "communication" relationship as between the person associated with mobile 305 (Name-1) and another person who is associated with a terminal that frequently communicates with mobile 305;

a familial relationship as between the subscriber who owns mobile 305 (Name-1) and a known sibling of the subscriber; and an association between the image of a person, e.g., image 303, and the identity of the person.

In some embodiments, after operation 905 is executed, control loops back to operation 901, wherein further polling is executed based on the received information in operation 903 and the "additional information" estimated in operation 905. In this way, more relevant data can be gathered and processed by data-processing system 101. When sufficient data have been gathered, control passes to operation 907.

At operation 907, data-processing system 101 generates "supplemental information" from (i) the received information in operations 901-903 and (ii) the estimated additional information in operation 907. In effect, this operation generates a superset of information that has been received, retrieved, inferred, estimated, and/or calculated by data-processing system 101 in reference to the person(s) and mobile unit(s) of interest.

Figure 10:
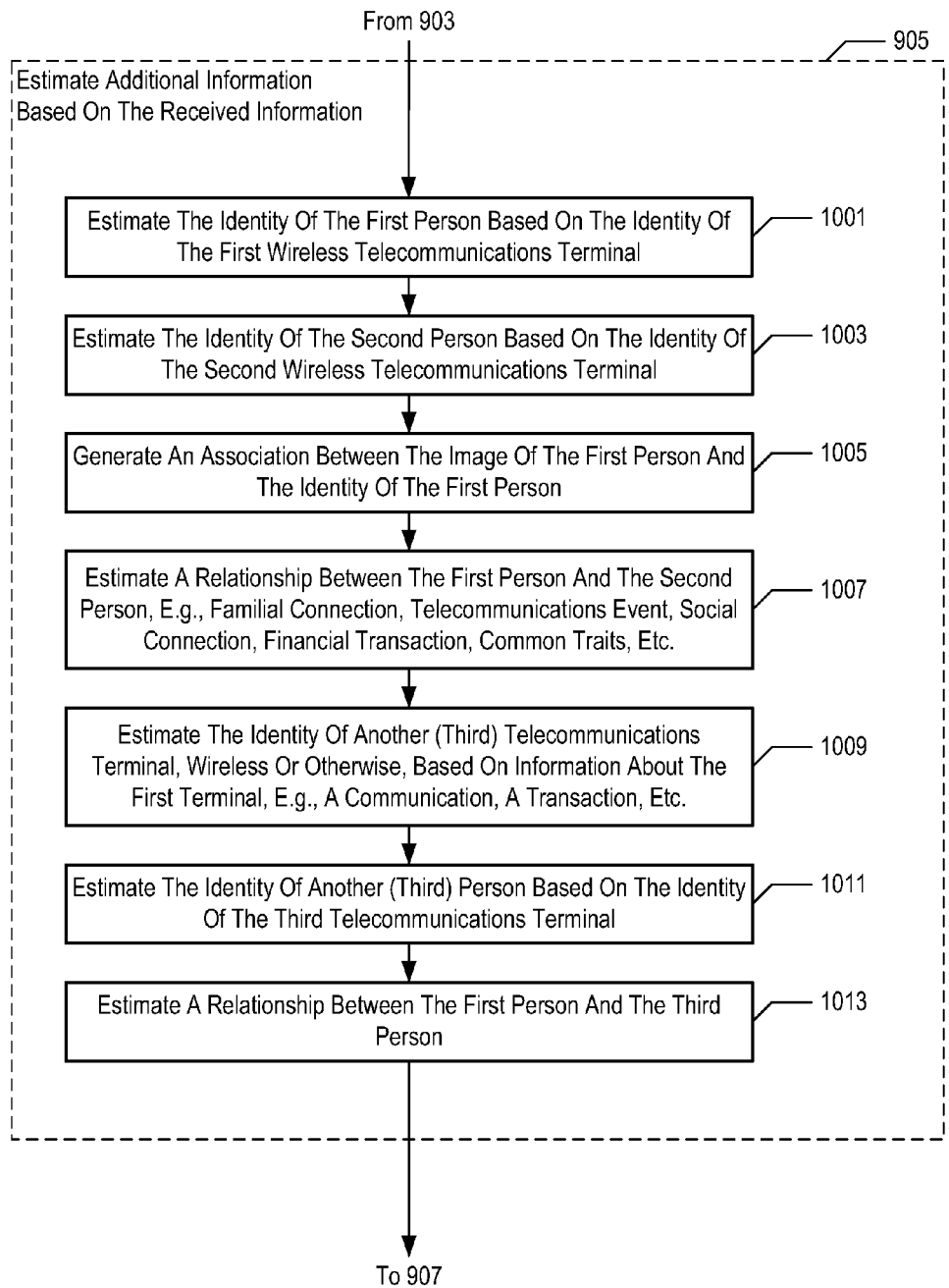
FIG. 10 depicts a flowchart of the salient operations of illustrative operation 905 in accordance with an illustrative embodiment of the present invention.

FIG. 10 depicts a flowchart of the salient operations of illustrative operation 905 in accordance with an illustrative embodiment of the present invention.

At operation 1001, data-processing system 101 estimates the identity of the first person based on the identity of the first mobile phone, e.g., data-processing system 101 estimates the identity of the person in image 303 based on the identity of mobile 305. Typically the identity of a person is expressed as a proper name, but in some embodiments it is expressed as a nickname or street name, or as some other moniker.

At operation 1003, data-processing system 101 estimates the identity of the second person based on the identity of the second mobile phone, e.g., data-processing system 101 estimates the identity of the person in image 603 based on the identity of mobile 605. Additionally, it should be noted that an image of the second person need not appear in a video frame; rather, data-processing system 101 estimates the identity of a mobile phone that is not "visible" in a frame based on its relationship to a person and/or mobile that appears in the frame. For example, when data-processing system 101 determines that mobile 305 is engaged in an active call with another terminal, e.g., mobile-3, data-processing system 101 can estimates the identity of the user of mobile-3 by retrieving information about the name of the subscriber who owns mobile-3. The image of the mobile-3 subscriber need not be visible in the surveillance area covered by video camera 103.

At operation 1005, data-processing system 101 generates an association between the image of the first person and the identity that was estimated for the first person, e.g., data-processing system 101 generates an association between image 303 and Name-1.

At operation 1007, data-processing system 101 estimates a relationship between the first person and the second person, e.g., a familial relationship, a telecommunications event, a social network connection, a financial transaction, a common trait, etc. For example, based on information retrieved from a public records database, data-processing system 101 estimates that Name-1 is a sibling of Name-2. For example, based on information received from communications reporting system 125 reporting that mobile 305 and mobile 605 frequently communicate by voice call and/or text messaging, data-processing system 101 estimates that there is a relationship between Name-1 (subscriber of mobile 305) and Name-2 (subscriber of mobile 605). For example, based on information received from social network system 129, data-processing system 101 estimates that there is a relationship between Name-1 and Name-2, because they are on each other's list of connections or "friends" on the social network system. For example, based on information received from financial reporting system 127, data-processing system 101 estimates that there is a relationship between Name-1 and Name-2, because funds have been transferred from a bank account belonging to Name-1 to a bank account belonging to Name-2. For example, based on information received from a criminal records database, data-processing system 101 estimates that there is a relationship between Name-1 and Name-2 based on a common trait, e.g., they both served time in the same prison over a certain period of time, or they both called the same telephone number at approximately the same time on a number of occasions. It will be clear to those having ordinary skill in the art, after reading the present disclosure, that numerous other relationships can be inferred in this operation based on information that data-processing system 101 receives from a variety of data sources.

At operation 1009, data-processing system 101 estimates the identity of another (third) telecommunications terminal (i.e., other than mobile 305 and mobile 605) based on information about the first mobile, such as a communication involving mobile 305, a transaction involving mobile 305, etc. Importantly, the third telecommunications terminal need not be wireless, and can be any wired or mobile phone. In the illustrative embodiment, the third terminal is a wired telephone. Illustratively, data-processing system 101 estimates the identity of terminal-3 (e.g., its telephone number) based on information indicating that mobile 305 is currently engaged in a voice call with terminal-3.

At operation 1011, data-processing system 101 estimates the identity of another (third) person based on the identity of the third terminal (terminal-3). For example, data-processing system 101 estimates the identity of the user of terminal-3 by retrieving information about the name of the subscriber who owns terminal-3.

At operation 1013, in a manner similar to operation 1007, data-processing system 101 estimates a relationship between the first person and the third person, e.g., a familial relationship, a telecommunications event, a social network connection, a financial transaction, a common trait, etc. As described in more detail in operation 1007, the information that forms the basis for estimating the relationship can be based on the identity of a mobile or on the identity of its known subscriber/owner.

It will be clear to those having ordinary skill in the art, after reading the present disclosure, how to define and estimate additional information that is useful and appropriate according to operation 905 and the principles of the present invention.

Figure 11:
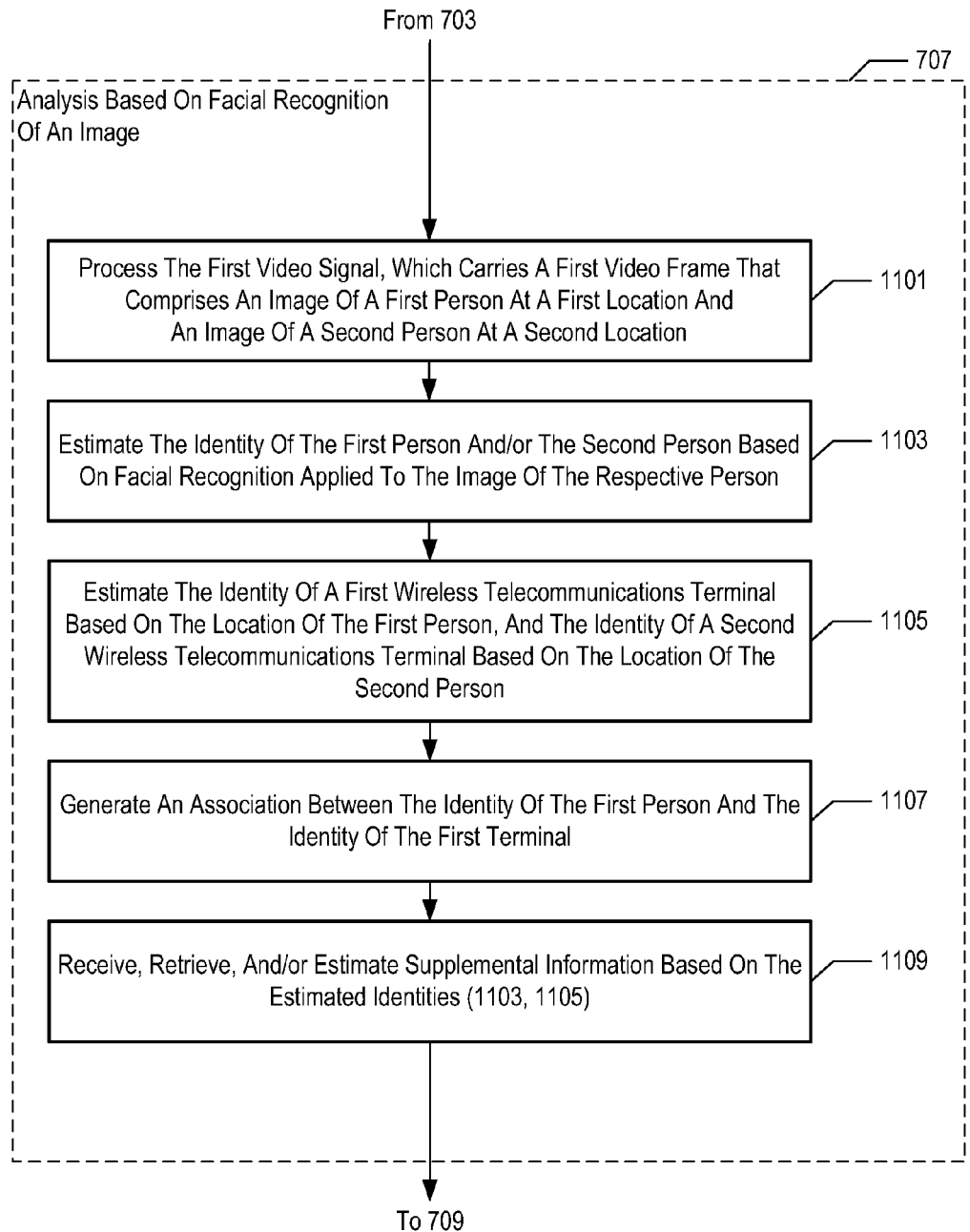
FIG. 11 depicts a flowchart of the salient operations of illustrative operation 707 in accordance with an illustrative embodiment of the present invention.

FIG. 11 depicts a flowchart of the salient operations of illustrative operation 707 in accordance with an illustrative embodiment of the present invention.

At operation 1101, as described in detail in operation 801, data-processing system 101 processes the first video signal, which carries a first video frame, e.g., video signal 111 carrying video frame 301.

At operation 1103, data-processing system 101 estimates the identity of the first person and/or the second person based on facial recognition applied to the image of the respective person. Thus, illustratively, image recognition is applied to image 303 and to image 603. Based on information obtained from facial recognition system 123, data-processing system 101 estimates the identity of the person in image 303 (Name-1) and also estimates the identity of the person in image 603 (Name-2). In an illustrative embodiment, the facial recognition analysis is executed at facial recognition system 123 and results are reported to data-processing system 101. In another illustrative embodiment, the facial recognition analysis is executed by data-processing system 101 based on data and parameters received from facial recognition system 123. When facial recognition is applied to an image of a person appearing in a video and the person's identity is thus recognized, data-processing system 101 generates an association between the identity according to the facial recognition and the identity of the co-located mobile phone. This association is displayed and also stored for archival purposes. This association can be critical when there is no personal identification available for a mobile phone such as a pre-paid mobile.

At operation 1105, as described in detail in operations 803 and 805, data-processing system 101 estimates the identity of the first and the second mobile phones based on the respective locations of the first and second persons.

At operation 1107, data-processing system 101 generates an association between the identity of the first person (operation 1103) and the identity of the first mobile phone (operation 1105).

At operation 1109, data-processing system 101 receives, retrieves, and estimates supplemental information based on the estimated identities from operations 1103 and 1105. This operation is described in more detail below.

Figure 12:
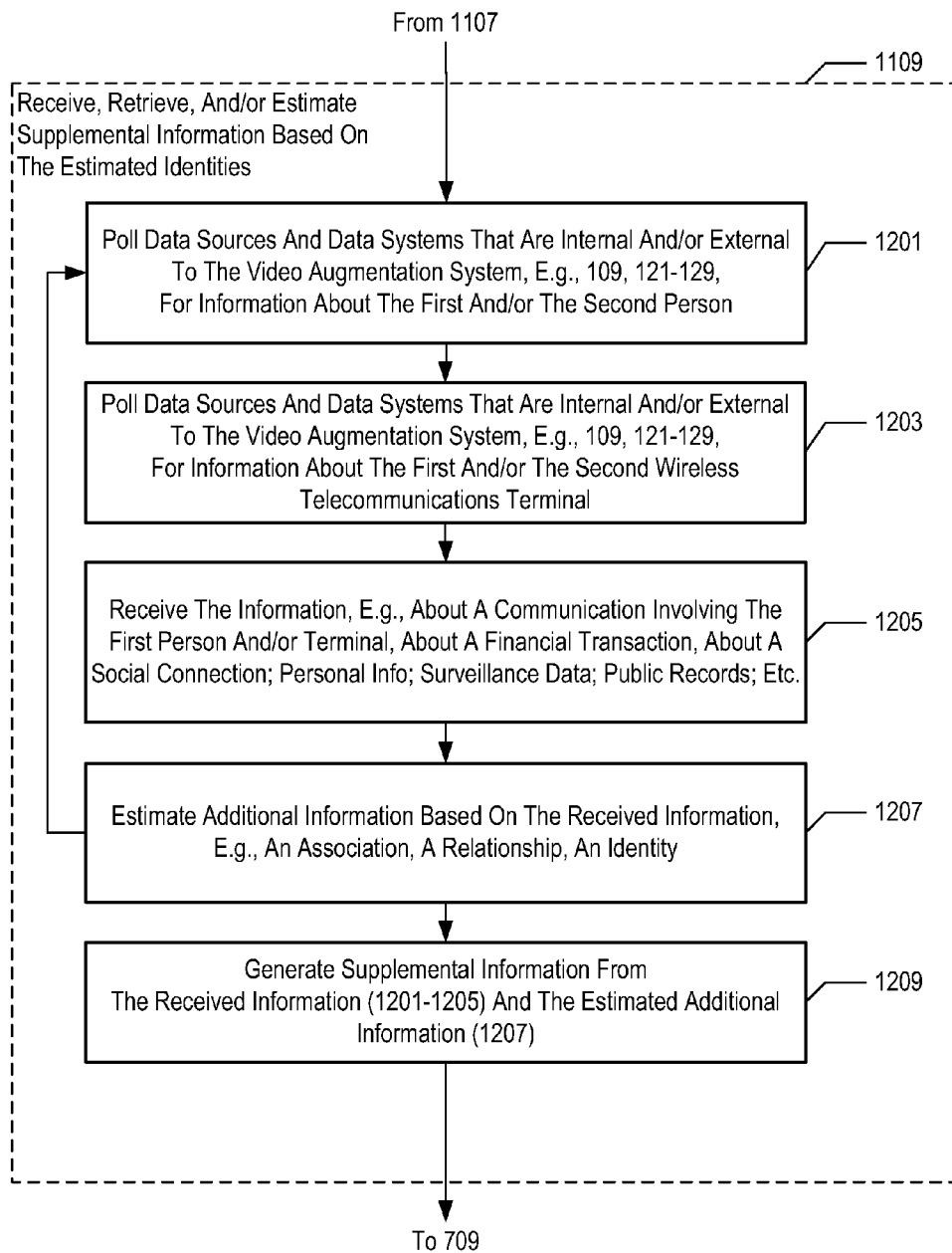
FIG. 12 depicts a flowchart of the salient operations of illustrative operation 1109 in accordance with an illustrative embodiment of the present invention.

FIG. 12 depicts a flowchart of the salient operations of illustrative operation 1109 in accordance with an illustrative embodiment of the present invention.

At operation 1201, data-processing system 101 polls data sources and data systems for information about the first person and second person, whose identities (Name-1 and Name-2) were estimated in earlier operations. The data sources and data systems being polled are internal and/or external to video augmentation system 100. In an illustrative embodiment, data-processing system 101 polls each of data store 109, data store 121, communication reporting system 125, financial reporting system 127, and social network system 129 for information about Name-1 and Name-2.

At operation 1203, as described in more detail at operation 901, data-processing system 101 polls data sources and data systems for information about the first and second mobile phone, whose identities were estimated in earlier operations.

At operation 1205, in a manner similar to operation 903, data-processing system 101 receives the polling results from polling operations 1201 and 1203. The polling results comprise information such as, illustratively:

a currently active communication involving Name-2—received from communication reporting system 125;
a currently active communication involving mobile 305—received from communication reporting system 125;
a financial transaction involving Name-1—received from financial reporting system 127;
a financial transaction involving mobile 305—received from financial reporting system 127;
a "social" connection involving Name-1 and Name-2—received from social network system 129;
personal information such as height and weight and distinguishing facial features for Name-1—received from a criminal records database;
surveillance information previously collected about mobile 305, Name-1, and Name-2—received from data store 109 and data store 121,
personal information such as birthdate, birthplace, address, etc.—received from a public records database; and
a call record of a past call involving mobile 305—received from communication reporting system 125.

At operation 1207 (described in more detail in the next figure) data-processing system 101 estimates additional information such as a relationship, an identity, and an association, based on the information received in the previous operation. Operation 1207 is similar to operation 905 described above.

In some embodiments, after operation 1207 is executed, control loops back to operation 1201, wherein further polling is executed based on the received information in operation 1205 and the "additional information" estimated in operation 1207. In this way, data-processing system 101 gathers more relevant data. When sufficient data has been gathered, control passes to operation 1209.

At operation 1209, in a manner similar to operation 907, data-processing system 101 generates "supplemental information" from (i) the received information in operations 1201-1205 and (ii) the estimated additional information in operation 1207. In effect, this operation generates a superset of information that has been received, retrieved, inferred, estimated, and/or calculated by data-processing system 101 in reference to the person(s) and mobile unit(s) of interest, e.g., Name-1 (image 303), Name-2 (image 603), mobile 305, and mobile 605.

Figure 13:
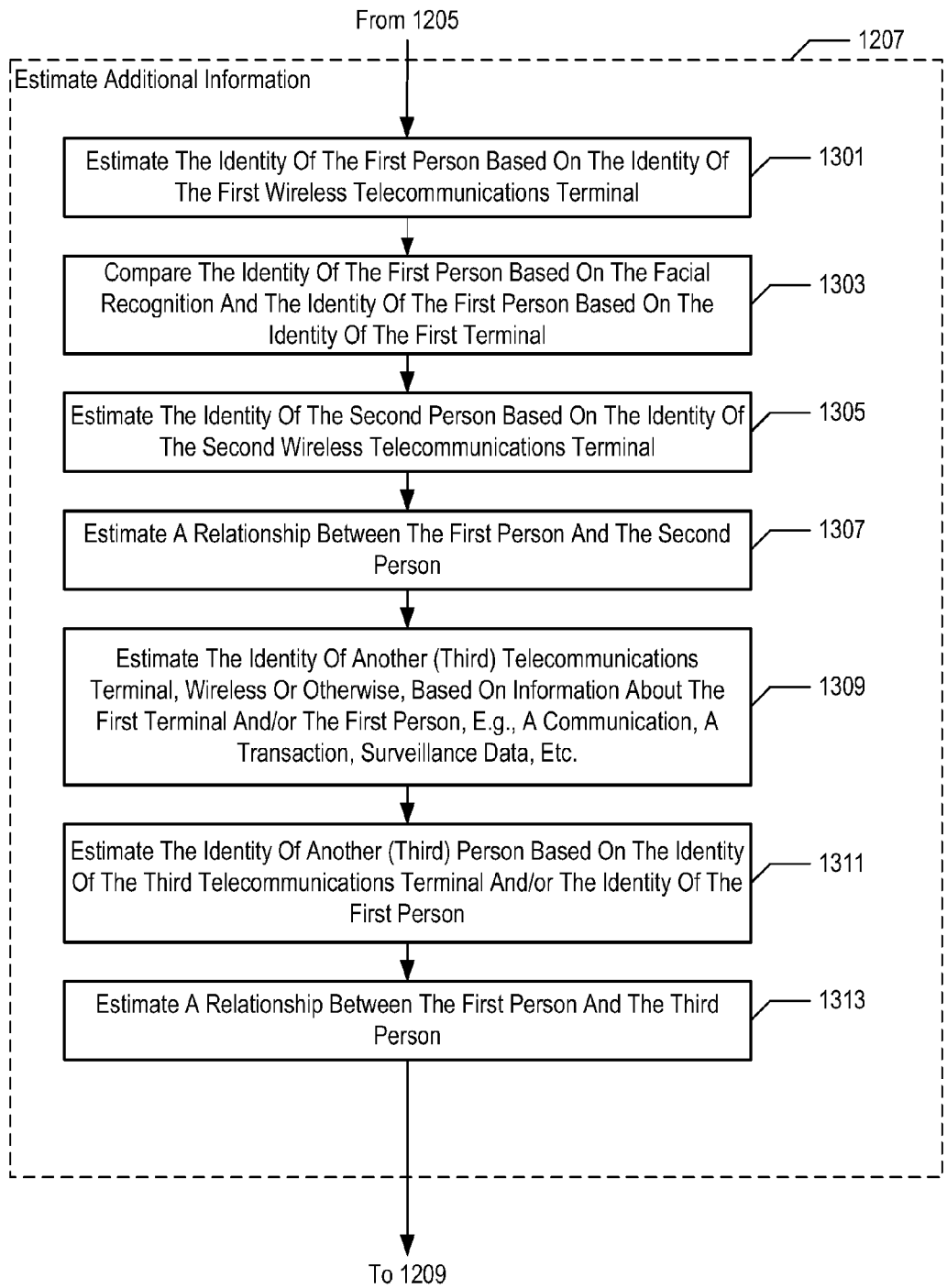
FIG. 13 depicts a flowchart of the salient operations of illustrative operation 1207 in accordance with an illustrative embodiment of the present invention.

FIG. 13 depicts a flowchart of the salient operations of illustrative operation 1207 in accordance with an illustrative embodiment of the present invention.

At operation 1301, which is the same as operation 1001, data-processing system 101 estimates the identity of the first person based on the identity of the first mobile phone (e.g., mobile 305).

At operation 1303, data-processing system 101 compares (i) the identity of the first person estimated on the basis of the facial recognition operation 1103 and (ii) the identity of the first person estimated on the basis of the identity of the first mobile phone (e.g., mobile 305). When the comparison produces a match or probable match, there is additional confidence that the user of mobile 305 is actually present at the scene under surveillance. The added confidence may enable additional enforcement action to be taken against the identified person.

At operation 1305, which is the same as operation 1003, data-processing system 101 estimates the identity of the second person based on the identity of the second mobile phone (e.g., mobile 605).

At operation 1307, which is the same as operation 1007, data-processing system 101 estimates a relationship between the first person (Name-1) and the second person (Name-2).

At operation 1309, which is the same as operation 1009, data-processing system 101 estimates the identity of another (third) telecommunications terminal, wireless or otherwise, based on information about the first terminal (e.g., mobile 305) and/or information about the first person (e.g., Name-1) such as a communication, a transaction, surveillance data, etc.

At operation 1311, which is similar to operation 1011, data-processing system 101 estimates the identity of another (third) person based on the identity of the third telecommunications terminal and/or based on the identity of the first person (Name-1).

At operation 1313, which is the same as operation 1013, data-processing system 101 estimates a relationship between the first person and the third person.

FIG. 14 depicts a flowchart of the salient operations of illustrative operation 709 in accordance with an illustrative embodiment of the present invention. Operation 709 follows operations 705 and 707, and is generally directed at generating a composite video signal that is transmitted, displayed and archived.

At operation 1401, data-processing system 101 selects the information that is to be displayed from the set of information that was received, retrieved, estimated, calculated, and generated in earlier operations. This set of information comprises the images of the persons in the video frame, the locations of the persons/mobiles in the video frames, the identities of the terminals, the identities of the persons, and other supplemental information that was inferred, estimated, calculated, and generated by the preceding operations. The selection process of operation 1401 depends on the choices of the implementers.

At operation 1403, data-processing system 101 generates each composite video frame for the composite video signal that is to be transmitted by data-processing system 101, e.g., composite video signal 113. Examples of composite video frames that are generated in the present operation are illustrated in FIGS. 3B through 6C, e.g., frame 311, frame 401, frame 501, frame 521, frame 601, frame 621, and frame 631. Each composite video frame is based on a first frame in the original incoming video signal, e.g., frame 301 in video signal 111. Thus, the original plain video feed is transformed and augmented with supplemental information that is advantageous over the plain contents of the original video signal such as video signal 111.

The generating process in the present operation involves compositing the incoming frame with supplemental information that augments the original. For example, in frame 311, frame 301 has been augmented with tag 315, which provides information about the person in image 303. For example, in frame 401, frame 301 has been augmented with tag 415 and tag 417. Tag 415 provides information about the person in image 303. Tag 417 provides information about another party who is currently communicating with the person in image 303. Likewise, for the remaining illustrative composite frames. Selecting what information to show and formatting the information that is to be augmented into the composite video frame remains at the discretion of the implementers of an embodiment of the present invention. For example, "ticker-tape" formatting might be appropriate for some information.

At operation 1405, data-processing system 101 generates a composite video signal that carries the composite frame generated in the preceding operation. Generating a video signal that comprises one or more frames is well known in the art.

At operation 1407, data-processing system 101 transmits the composite video signal to a display unit, e.g., display 107. This operation is well known in the art.

At operation 1409, each composite frame is displayed as part of the composite video signal received at the display unit, e.g., display 107. This operation is well known in the art.

At operation 1411, data-processing system 101 transmits the composite video signal to a data store, e.g., data store 109, data store 121, for archiving and for later retrieval. In some embodiments all or some of the supplemental data is also transmitted for archiving, but not in the form of a video signal. For example, original video signal 111 is archived in data store 109. For example, the associations generated by data-processing system 101 are archived in data store 109, etc. In some embodiments, a database is constructed (in electronic form) from the various data that have been received, inferred, estimated, calculated, and generated by data-processing system 101. What particular data are selected and what formats and data structures are used for archiving and/or database construction remains at the discretion of the implementers of the embodiment of the present invention. Archiving data is well known in the art. It should be noted that data can also be transmitted to and stored by other systems that are in communication with video augmentation system 100, such as systems 123-131, and other systems recited herein, such as a surveillance system, etc.

At operation 1413, the receiving data store and/or system archives the data received from data-processing system 101, e.g., data store 109, data store 121, systems 123-131, etc. This operation is well known in the art.

It is to be understood that the disclosure teaches only some examples of illustrative embodiments and that many variations of the invention can easily be devised by those skilled in the art after reading this disclosure. The scope of the present invention is to be determined by the following claims.

What is claimed is:

1. A method comprising:
  receiving, by a data-processing system, a first video signal that carries a first video frame, wherein the first video frame comprises an image in which a first person appears at a location;
  estimating the identity of a first mobile phone based on the location of the first person, wherein the location is determined from the first video frame;

polling, by the data-processing system, a data source for information about the first mobile phone, based on the identity of the first mobile phone;

receiving, by the data-processing system, information regarding a communication involving the first mobile phone, in response to the polling; and transmitting, by the data-processing system, a second video signal that carries a second video frame that is based on the first video frame, wherein the second video frame comprises:
  (i) the image in which the first person appears, and
  (ii) a depiction of the information regarding the communication.

2. The method of claim 1 further comprising:
estimating the identity of the first person based on the identity of the first mobile phone; and
wherein the second video frame further comprises:
  (iii) a depiction of the identity of the first person.

3. The method of claim 1 wherein the second video frame further comprises:
  (iii) a depiction of the identity of the first mobile phone.

4. The method of claim 1 further comprising:
estimating, based on the information regarding the communication, the identity of a second telecommunications terminal;
wherein the second video frame further comprises:
  (iii) a depiction of the identity of the second telecommunications terminal.

5. The method of claim 1 further comprising:
estimating, based on the information regarding the communication, the identity of a second telecommunications terminal;
estimating the identity of a second person based on the identity of the second telecommunications terminal; and
wherein the second video frame further comprises:
  (iii) a depiction of the identity of the second person.

6. The method of claim 1 wherein the image in which the first person appears is sufficient to identify the first person.

7. The method of claim 1 wherein the image in which the first person appears is insufficient to identify the first person.

8. The method of claim 1 further comprising:
estimating, by the data-processing system, the identity of the first person based on the identity of the first mobile phone;
estimating, based on the information regarding the communication, the identity of a second telecommunications terminal;
estimating the identity of a second person based on the identity of the second telecommunications terminal; and
estimating a relationship between the first person and the second person; and
wherein the second video frame further comprises:
  (iii) a depiction of the relationship between the first person and the second person.

9. The method of claim 1, further comprising detecting the image in which the first person appears, wherein the location of the first person is determined also based on the detecting.

10. A data-processing system comprising:
a non-transitory memory that stores program code;
a processor that when executing the program code is for
  estimating the identity of a first mobile phone based on a location of a first person, wherein a first video frame comprises an image in which the first person appears at the location, and wherein the location is determined from the first video frame; and
a transceiver for:
  (a) receiving a first video signal that carries the first video frame,
  (b) polling a data source for information about the first mobile Phone, based on the identity of the first mobile phone,
  (c) receiving information regarding a communication involving the first mobile phone, in response to the polling, and
  (d) transmitting a second video signal that carries a second video frame that is based on the first video frame, wherein the second video frame comprises:
    (i) the image in which the first person appears, and
    (ii) a depiction of the information regarding the communication.

11. The data-processing system of claim 10 wherein the processor, when executing the program code, is further for estimating the identity of the first person based on the identity of the first mobile phone; and
wherein the second video frame further comprises:
  (iii) a depiction of the identity of the first person.

12. The data-processing system of claim 10 wherein the second video frame further comprises:
  (iii) a depiction of the identity of the first mobile phone.

13. The data-processing system of claim 10 wherein the processor, when executing the program code, is further for estimating, based on the information regarding the communication, the identity of a second telecommunications terminal;
wherein the second video frame further comprises:
  (iii) a depiction of the identity of the second telecommunications terminal.

14. The data-processing system of claim 10 wherein the processor, when executing the program code, is further for:
  (a) estimating, based on the information regarding the communication, the identity of a second telecommunications terminal, and
  (b) estimating the identity of a second person based on the identity of the second telecommunications terminal; and
wherein the second video frame further comprises:
  (iii) a depiction of the identity of the second person.

15. The data-processing system of claim 10 wherein the processor, when executing the program code, is further for:
  (a) estimating the identity of the first person based on the identity of the first mobile phone,
  (b) estimating, based on the information regarding the communication, the identity of a second telecommunications terminal,
  (c) estimating the identity of a second person based on the identity of the second telecommunications terminal, and
  (d) estimating a relationship between the first person and the second person; and
wherein the second video frame further comprises:
  (iii) a depiction of the relationship between the first person and the second person.

* * * * *